(12) United States Patent
Chen

(10) Patent No.: US 11,960,759 B2
(45) Date of Patent: Apr. 16, 2024

(54) MEMORY DEVICE AND DATA SEARCHING METHOD THEREOF

(71) Applicant: MACRONIX INTERNATIONAL CO., LTD., Hsinchu (TW)

(72) Inventor: Shih-Hung Chen, ChuTung Village, (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 72 days.

(21) Appl. No.: 17/851,238

(22) Filed: Jun. 28, 2022

(65) Prior Publication Data
US 2023/0418510 A1 Dec. 28, 2023

(51) Int. Cl.
*G06F 12/00* (2006.01)
*G06F 3/06* (2006.01)
*G06F 16/9032* (2019.01)

(52) U.S. Cl.
CPC .......... *G06F 3/0655* (2013.01); *G06F 3/0604* (2013.01); *G06F 3/0679* (2013.01); *G06F 16/9032* (2019.01)

(58) Field of Classification Search
CPC .... G06F 3/0655; G06F 3/0604; G06F 3/0679; G06F 16/9032
USPC ........................................................ 711/154
See application file for complete search history.

(56) References Cited

U.S. PATENT DOCUMENTS

| | | | |
|---|---|---|---|
| 6,167,156 A * | 12/2000 | Antoniades | G06V 20/13 382/232 |
| 8,392,446 B2 | 3/2013 | Chi et al. | |
| 9,552,205 B2 | 1/2017 | Ermolaev et al. | |
| 11,436,071 B2 | 9/2022 | Akel et al. | |
| 2019/0108280 A1* | 4/2019 | Liu | G06F 16/951 |

FOREIGN PATENT DOCUMENTS

| | | | | |
|---|---|---|---|---|
| CN | 101290545 A | 10/2008 | | |
| CN | 105706155 A | 6/2016 | | |
| EP | 2003652 A2 * | 12/2008 | | G11C 29/00 |
| KR | 20200058584 A * | 5/2020 | | |
| KR | 20210152738 A * | 12/2021 | | |
| TW | 200912680 A | 3/2009 | | |
| TW | 201931163 A | 8/2019 | | |
| TW | 1749691 B | 12/2021 | | |
| WO | 2008133898 A1 | 11/2008 | | |

* cited by examiner

*Primary Examiner* — Mardochee Chery
(74) *Attorney, Agent, or Firm* — McClure, Qualey & Rodack, LLP

(57) ABSTRACT

A data search method for a memory device is provided. The data search method includes: based on a recorded compression mode, vectoring a search data to generate a search data vector, and based on the recorded compression mode, compressing the search data and a plurality of objects in a database; setting a search condition; searching the objects of the database by the search data vector to determine whether the search data is matched with the objects of the database; and recording and outputting at least one matched object of the database, the at least one matched object matched with the search data.

18 Claims, 22 Drawing Sheets

«MEMORY DEVICE AND DATA SEARCHING METHOD THEREOF»

TECHNICAL FIELD

The disclosure relates in general to a memory device and a data searching method thereof.

BACKGROUND

In information age, similarity analysis are widely applied in such as, text mining, data mining, copy detection, recommendation system, human face recognition, voiceprint recognition, fingerprint recognition etc.

Similarity analysis is usually implemented by vector analysis. Common vector analysis is for example but not limited by, Euclidean distance, Cosine similarity and Hamming distance etc.

For similarity analysis, object features are extracted and vectored. For example, AI training is performed on a large database. After model training, the AI model may vectorize the input human information. A well-trained model may vectorize several images of the same person into vectors having high similarity. After the search object is vectored, similarity analysis is performed on the search object and the database objects to search whether the search object is similar with the database objects.

Thus, there is a need to have a memory device and a data search method thereof, which achieves simple calculation with high analysis confidence.

SUMMARY

According to one embodiment, a data search method for a memory device is provided. The data search method includes: based on a recorded compression mode, vectoring a search data to generate a search data vector, and based on the recorded compression mode, compressing the search data and a plurality of objects in a database; setting a search condition; searching the objects of the database by the search data vector to determine whether the search data is matched with the objects of the database; and recording and outputting at least one matched object of the database, the at least one matched object matched with the search data.

According to another embodiment, a memory device is provided. The memory device includes: a plurality of memory planes, each of the memory planes including a memory array, the memory array including a plurality of memory blocks, a plurality of word lines and a plurality of bit lines, each of the memory blocks including a plurality of a plurality of memory cells on a plurality of intersections between the word lines and the bit lines; wherein in each of the memory blocks, a memory cell group includes the m memory cells, n memory cells among the m memory cells are programmed to have a first threshold voltage and (m-n) memory cells among the m memory cells are programmed to have a second threshold voltage, m being a positive integer equal to or larger than 2, n being a positive integer equal to or larger than 1, the memory cell group stores a first feature vector of a first object; in data search, a search data is encoded into m search voltages, n search voltages among the m search voltages have a first search voltage and (m-n) search voltages among the m search voltages have a second search voltage; in data search, p memory blocks coupled to a first bit line are concurrently selected, p being a positive integer equal to or larger than 2; and based on a current sensing result on the first bit line, determining whether the search data is matched with the first feature vector of the first object stored in the memory cell group.

According to another embodiment, a memory device is provided. The memory device includes: a memory array; and a controller, coupled to the memory array, wherein the controller is configured for: based on a recorded compression mode, vectoring a search data to generate a search data vector, and based on the recorded compression mode, compressing the search data and a plurality of objects in a database, the plurality of objects of the database are stored in the memory array; setting a search condition; searching the objects of the database by the search data vector to determine whether the search data is matched with the objects of the database of the memory array; and recording and outputting at least one matched object of the database, the at least one matched object matched with the search data.

Figure 1A:
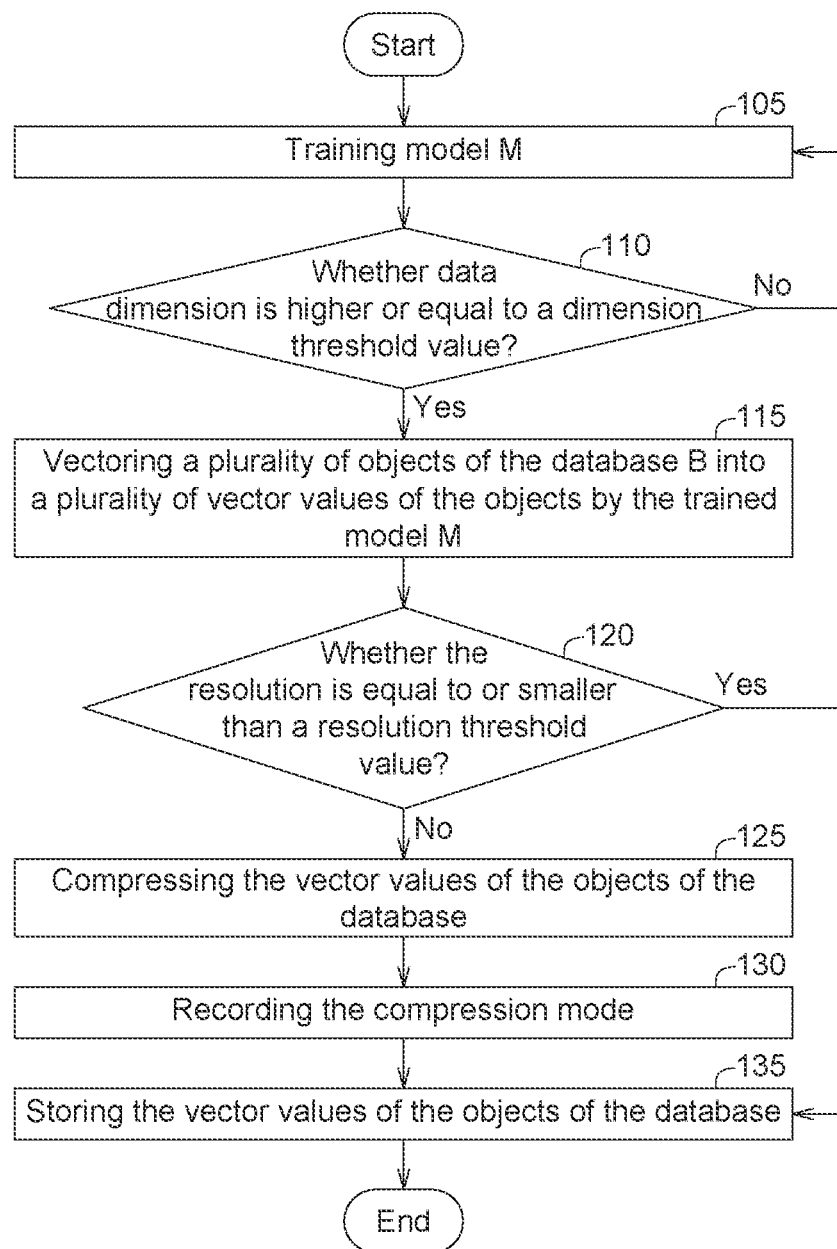
FIG. 1A shows a flow chart for configuring a vector database according to a first embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

First Embodiment

Figure 1B:
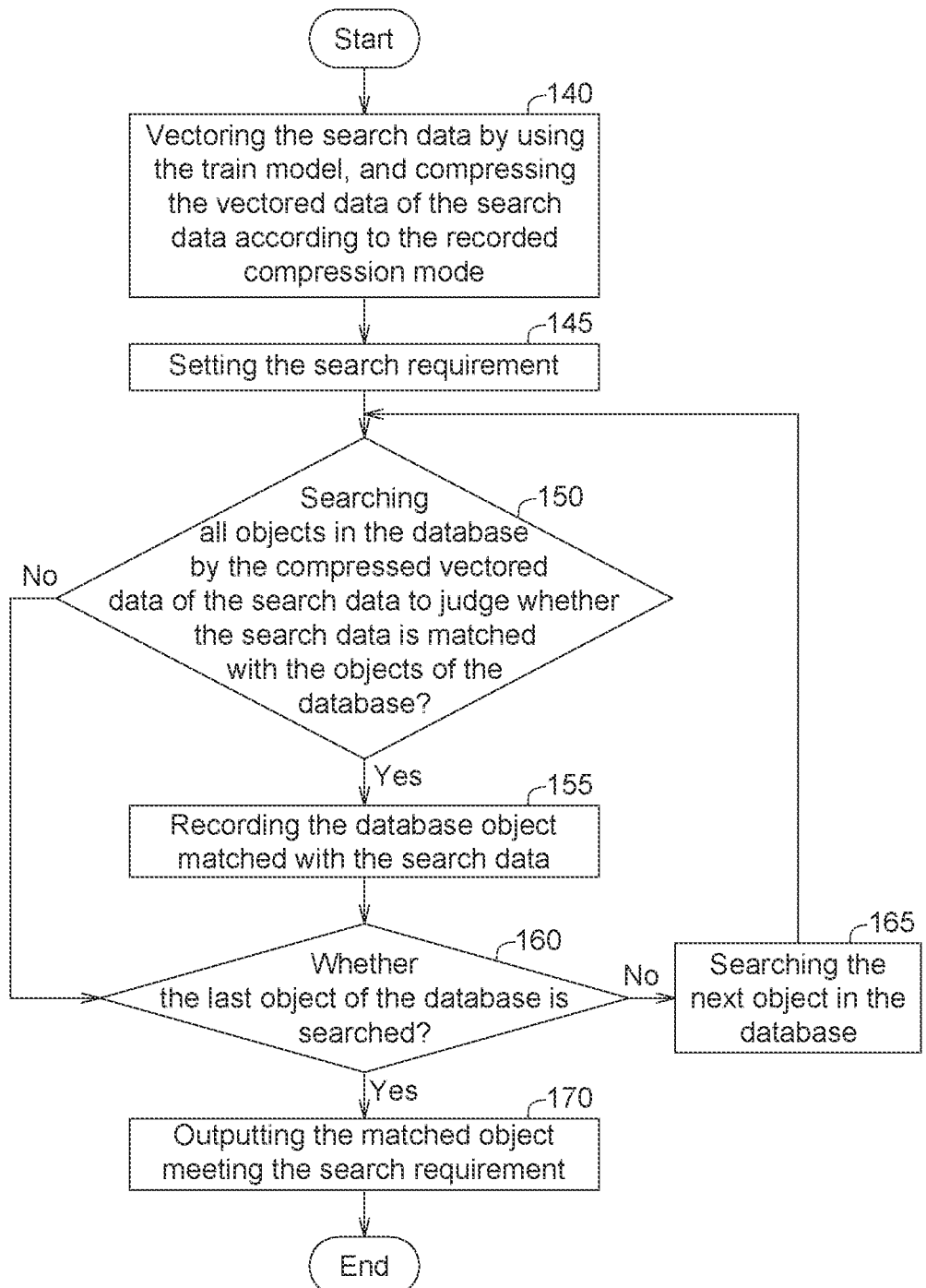
FIG. 1B shows a flow chart of a data search method according to the first embodiment of the application.

FIG. 1A shows a flow chart for configuring a vector database according to a first embodiment of the application. FIG. 1B shows a flow chart of a data search method according to the first embodiment of the application.

Refer to FIG. 1A. In the step 105, a model M is trained. In the application, details of training the model M are not specified.

In the step 110, it is judged whether data dimension is higher or equal to a dimension threshold value. For example but not limited by, the dimension threshold value is 64. In usual, when data has higher dimension, it is helpful in accuracy calculating; and when data has lower dimension, it is helpful in reducing calculating resource. Thus, selection of dimension threshold value is a tradeoff between accuracy calculating and reducing calculating resource.

In the step 115, a plurality of objects (data) of the database (also referred as the database B) are vectored into a plurality of vector values of the objects (data) by the trained model M. The database stores a plurality of objects. For example but not limited by, the trained model M vectors an object A of the database into the vector values $A=(A_1, A_2, \ldots, A_n)$ of the object A, wherein n is a positive integer, which represents the dimension. In human face recognition, voiceprint recognition and fingerprint recognition operations, the human face objects, the voiceprint objects, the fingerprint objects are vectored. In usually, when the dimension n is higher, it is helpful in accuracy calculation, and when the dimension n is lower, it is helpful in reducing the calculation resource. Thus, setting of the dimension n is a tradeoff between the above requirements.

The object A may be for example but not limited by, human face images (used in human face recognition), human voiceprint objects (used in voiceprint recognition), human fingerprint objects (used in fingerprint recognition) etc.

In the step 120, it is judged whether the resolution is equal to or smaller than a resolution threshold value. For example but not limited by, the resolution threshold value is 3 bits. When the step 120 is negative, the vector values of the objects of the database are compressed (the step 125). When the step 120 is positive, the vector values of the objects of the database are stored (the step 135). In one embodiment of the application, a better operation result is generated when the resolution is equal to or smaller than 3 bits (8 states).

In one possible example of the application, data compression in the step 125 is for example but not limited by, data-equal-quantity compression or dimension-equal-quantity compression which are described in details later.

In the step 130, the compression mode (or said the compression mode) (either the data-equal-quantity compression mode or the dimension-equal-quantity compression mode) is recorded.

Further, in one embodiment of the application, when new objects are added into the database, if the data amount of the existing objects is much larger than the data amount of the new objects, the new objects are compressed by the current compression mode. However, if the data amount of the existing objects is much smaller than the data amount of the new objects, the new objects are still compressed by the current compression mode. But if the new objects cause significant variation on data distribution of the database, which means the database contains totally different information from the original objects, then the database is re-compressed. In re-compressing the database, the data-equal-quantity compression or the dimension-equal-quantity compression is adapted but the compression point is changed.

Now refer to FIG. 1B. The search data (the comparison data, the recognition data) is used in searching the database to search database objects similar to the search data. For example but not limited by, the database is a human face image database, the human face image fetched by the camera may be used as the search data in searching the human face image database to search database objects similar to the search data.

In the step 140, the search data is vectored by using the train model M, and the vectored data of the search data is compressed according to the compression mode (data-equal-quantity compression or dimension-equal-quantity compression) recorded in the step 130. That is, in one embodiment of the application, for example but not limited by, when the resolution is 3 bits, after compression, each dimension vector of the objects of the database is compressed as or lower than 3 bits or 8 states, and each dimension vector of the search data is compressed as or lower than 3 bits or 8 states.

In the step 145, the search requirement is set (for example but not limited by, the quantity or ratio of the matched dimensions).

In the step 150, the compressed vectored data of the search data is used in searching all objects in the database to judge whether the search data is matched with the objects of the database. For example but not limited by, when the matched dimensions between the search data and the database object meet the search requirement, it judges the search data is similar or the same as the matched object of the database and vice versa.

For example but not limited by, the object data has 512 dimensions. When the matched dimensions between the search data and the database object are higher than the search requirement (for example but not limited by, 300 dimensions), it judges the search data is similar or the same as the matched object of the database.

When the step 150 is positive, the database object matched with the search data is recorded (the step 155); and when the step 150 is negative, then it is judged whether the last object of the database is searched (the step 160).

In the step 155, the recorded object information includes but not limited by, the object number, the object name, the matched values and etc.

When the step 160 is negative, the compressed vectored data of the search data searches the next object in the database (the step 165). When the step 160 is positive, the matched object meeting the search requirement is output (the step 170).

In the step 170, the matched object information to be output may be, for example but not limited by, the raw data of the object, the sorted data of the object, data of several objects having high matched degree or data of the object having highest signal strength (highest match degree).

Now details of the vector database configuration and the data search method are described. When the similarity analysis is implemented by Hamming distance, the advantage is fast calculation. Thus, Hamming distance may be used in high dimension low resolution similarity analysis. High dimension is helpful in solving accuracy problem due to low resolution, and low resolution has advantages in fast calculation, low storage data size, fast database read etc. In the following, Hamming distance is used in achieving fast and accuracy calculation, but the application is not limited by this.

Table 1 shows one example of the database. Here, the database B is a human face image database, but the application is not limited by this. The human face image database stores a plurality of human face images belonging to different persons, wherein each person has several human face images. Besides, there are 512 dimensions, but the application is not limited by this.

TABLE 1

| Code | Ba1 | Ba2 | ... | Bb1 | Bb2 | ... |
|---|---|---|---|---|---|---|
| person | a | a | ... | b | b | ... |
| image | 1 | 2 | ... | 1 | 2 | ... |
| D1 (vector 1) | $Ba1_1$ | $Ba2_1$ | ... | $Bb1_1$ | $Bb2_1$ | ... |
| D2 (vector 2) | $Ba1_2$ | $Ba2_2$ | ... | $Bb1_2$ | $Bb2_2$ | ... |
| D3 (vector 3) | $Ba1_3$ | $Ba2_3$ | ... | $Bb1_3$ | $Bb2_3$ | ... |
| ... | ... | ... | ... | ... | ... | ... |
| D510 (vector 510) | $Ba1_{510}$ | $Ba2_{510}$ | ... | $Bb1_{510}$ | $Bb2_{510}$ | ... |
| D511 (vector 511) | $Ba1_{511}$ | $Ba2_{511}$ | ... | $Bb1_{511}$ | $Bb2_{511}$ | ... |
| D512 (vector 512) | $Ba1_{512}$ | $Ba2_{512}$ | ... | $Bb1_{512}$ | $Bb2_{512}$ | ... |

In the table 1, "a" and "b" refer to different persons and "1" and "2" refer to different images. Thus, "Ba1" refers to the first image of the person "a", "Ba2" refers to the second image of the person "a", "Bb2" refers to the second image of the person "b", and others are so on.

The trained AI model vectors "Ba1" (the first image of the person "a") into the vectors: ($Ba1_1$, $Ba1_2$, $Ba1_3$, ..., $Ba1_{510}$, $Ba1_{511}$, $Ba1_{512}$). The vector "$Ba1_1$" refers to the first dimension vector of "Ba1" (the first image of the person "a") and others are so on.

Table 2 shows one example of table 1.

TABLE 2

| Code | Ba1 | Ba2 | ... | Bb1 | Bb2 | ... |
|---|---|---|---|---|---|---|
| person | a | a | ... | b | b | ... |
| image | 1 | 2 | ... | 1 | 2 | ... |
| D1 (vector 1) | 0.12 | 0.03 | ... | 0.04 | 0.10 | ... |
| D2 (vector 2) | −0.06 | −0.16 | ... | −0.15 | −0.08 | ... |
| D3 (vector 3) | 0.03 | 0.12 | ... | 0.11 | −0.07 | ... |
| ... | ... | ... | ... | ... | ... | ... |
| D510 (vector 510) | 0.05 | 0.14 | ... | 0.09 | 0.05 | ... |
| D511 (vector 511) | 0.09 | 0.16 | ... | 0.15 | −0.03 | ... |
| D512 (vector 512) | −0.06 | 0.01 | ... | 0.07 | 0.14 | ... |

In table 2, the vectors are normalized. After normalization, the vectors are between +0.16 and −0.16, but the application is not limited by this.

Figure 2:
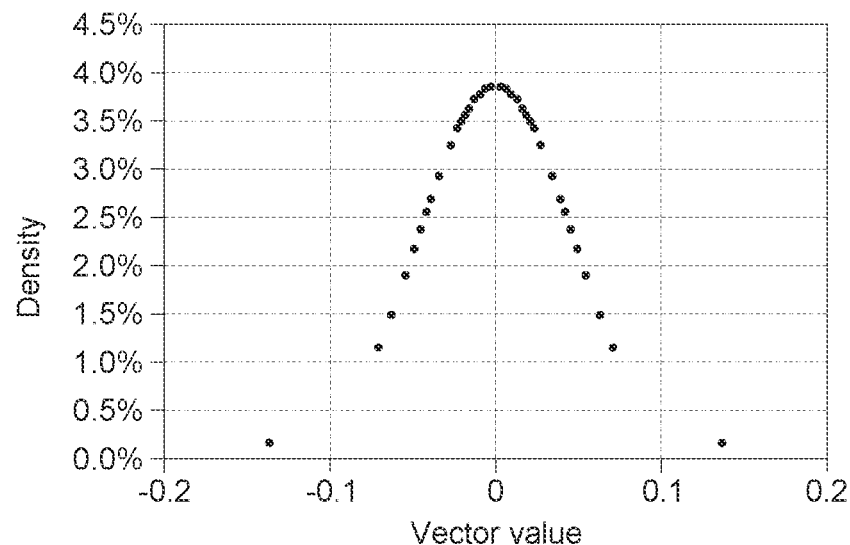
FIG. 2 shows one example of vector value analysis of the database according to the first embodiment of the application.

FIG. 2 shows one example of vector value analysis of the database according to the first embodiment of the application. The application is not limited by this. In FIG. 2, the horizontal axis refers to the vector value and the vertical axis refers to the density of the vector values in the database. It is assumed that the database has 19955 images belonging to different persons, and each person has several images. The model vectors each image into 512 values, i.e. data has 512 dimensions. Thus, data vector has 32 states. For example, the density of the vector value 0.05 is 1.9%, which means the vector value of 0.05 occupies 1.9% of the whole data.

Data search in the first embodiment of the application is described. Human face recognition is as an example which is not to limit the application. In the human face database, after model vectorization, the first human face image Ba1 of the person a is represented as: ($Ba1_1$, $Ba1_2$, $Ba1_3$, ... $Ba1_{510}$, $Ba1_{510}$, $Ba1_{512}$). The human face image of the person x is fetched by the camera. After model vectorization, the human face image Bx of the person x is represented as: ($Bx1_1$, $Bx1_2$, $Bx1_3$, ..., $Bx1_{510}$, $Bx1_{511}$, $Bx1_{512}$). In the step 150, the vectors ($Bx1_1$, $Bx1_2$, $Bx1_3$, ..., $Bx1_{510}$, $Bx1_{511}$, $Bx1_{512}$) of the search data is used for searching or comparing the vectors ($Ba1_1$, $Ba1_2$, $Ba1_3$, ... $Ba1_{510}$, $Ba1_{511}$, $Ba1_{512}$) of the first human face image Ba1 of the person a. When $Bx1_1$ is matched with $Ba1_1$, the first dimension is matched; and when $Bx1_1$ is not matched with $Ba1_1$, the first dimension is not matched. After all dimensions are compared, the matched dimension quantity is found. When the match dimensions between the vectors of the human face image Bx of the person x and the first human face image Ba1 of the person a are higher than the search requirement (for example but not limited by, 300 dimension), then the person x is matched the person a, that is, after human face recognition, the person x and the person a are the same person and vice versa.

Details of vector compression (data digitalization) of the first embodiment of the application are described. In the first embodiment of the application, reducing the resolution is helpful in Hamming distance calculation and thus, data is compressed to lower the resolution.

In here, the resolution is one bit while "0" is as the compression point. When Bn (the vector value) is smaller than or equal to 0, Bn is compressed as 0; and when Bn (the vector value) is larger than 0, Bn is compressed as 1.

Alternatively, in other possible example, the resolution is one bit while the middle value "middle(Bn)" is as the compression point, wherein the middle value "middle(Bn)" is the middle value of all vector values. When Bn (the vector value) is smaller than or equal to "middle(Bn)", Bn is compressed as 0; and when Bn (the vector value) is larger than "middle(Bn)", Bn is compressed as 1.

Alternatively, in other possible example, the resolution is one bit while the average value "avg(Bn)" is as the compression point, wherein the average value "avg(Bn)" is the average value of all vector values. When Bn (the vector value) is smaller than or equal to "avg(Bn)", Bn is compressed as 0; and when Bn (the vector value) is larger than "avg(Bn)", Bn is compressed as 1.

Figure 3:
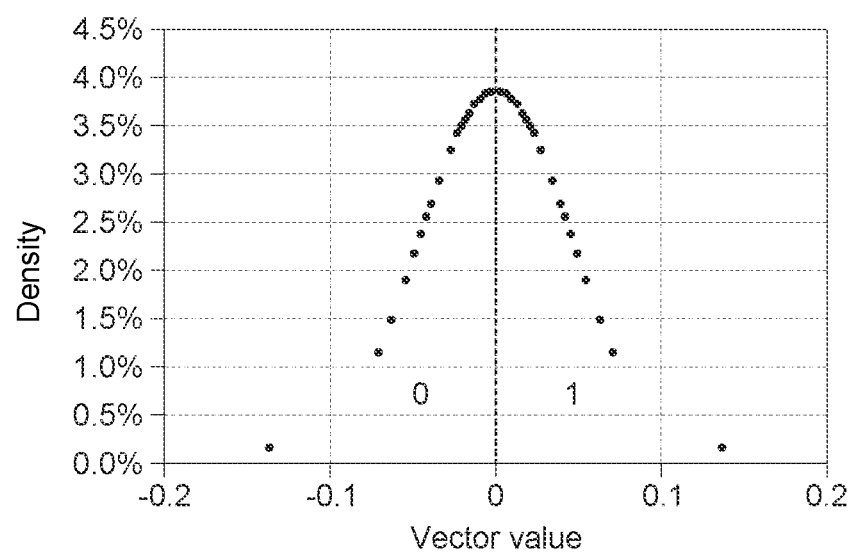
FIG. 3 shows vector compression according to the first embodiment of the application.

FIG. 3 shows vector compression according to the first embodiment of the application. In FIG. 3, the case that the resolution is one bit while "0" is as the compression point is as an example, which is not to limit the application.

After compression, if the vector value of the database is unevenly distributed due to some reasons, then taking the middle value "middle(Bn)" as the compression point may achieve better compression effects. In the application, data partition and data compression have the same or similar meaning.

Figure 4A:
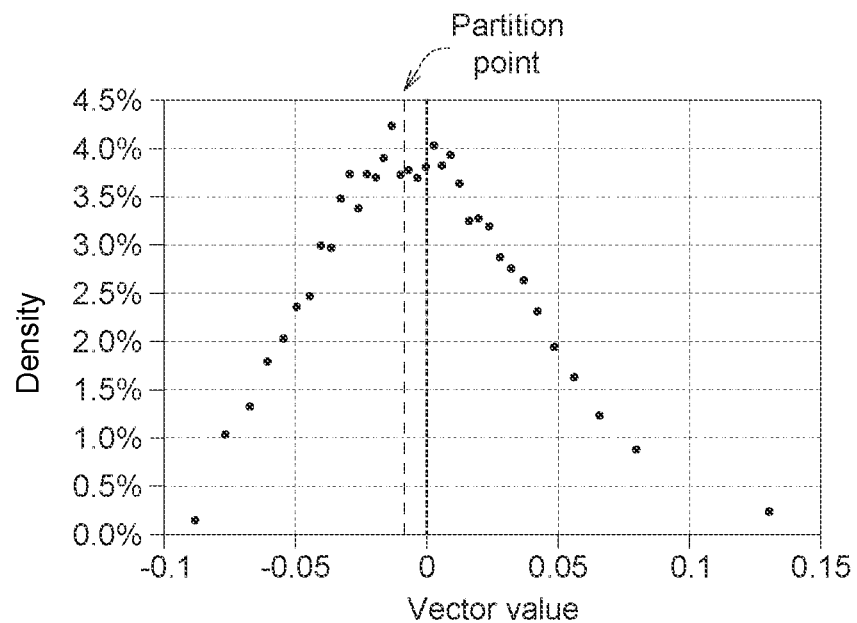
FIG. 4A and FIG. 4B show vector compression according to the first embodiment of the application, wherein data partition is based on the dimensions.
Figure 4B:
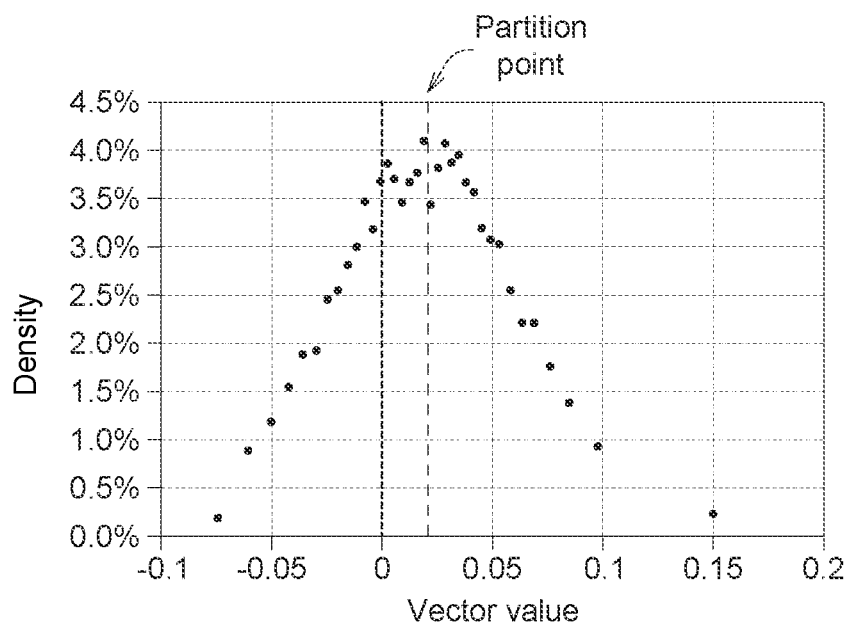

FIG. 4A and FIG. 4B show vector compression according to the first embodiment of the application, wherein data partition is based on the dimensions. FIG. 4A shows data distribution at the $15^{th}$ dimension (D15) (the total dimension is 512); and FIG. 4B shows data distribution at the $109^{th}$ dimension (D109) (the total dimension is 512). As shown in FIG. 4A and FIG. 4B, data compression results are totally different in taking "0" and the middle value "middle(Bn)" as the compression point, respectively.

Figure 5:
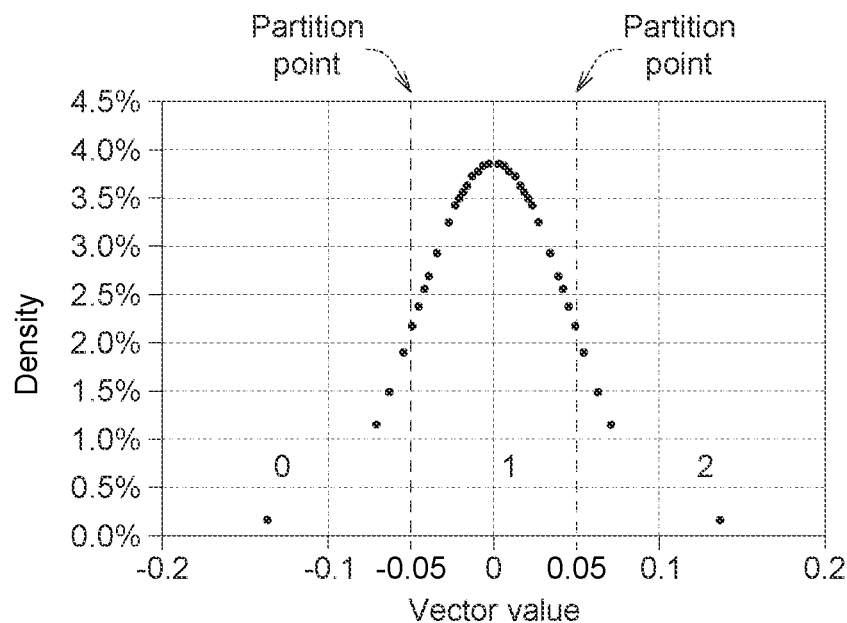
FIG. 5 shows data compression result of the dimension-equal-quantity compression according to the first embodiment of the application.

FIG. 5 shows data compression result of dimension-equal-quantity compression according to the first embodiment of the application. As shown in FIG. 5, data may be compressed by dimension-equal-quantity into m parts (m may be 2, 3, 4, 5 . . . or any positive integer). When m=2, the compression result is 2 states, i.e. 0 or 1, and the resolution is one bit. When m=3, the compression result is 3 states, i.e. 0 or 1 or 2. When m=4, the compression result is 4 states, i.e. 0 or 1 or 2 or 3, and the resolution is two bits. Others are so on. FIG. 5 shows data compression on the data vectors by dimension-equal-quantity compression into three states (0 or 1 or 2) and the partition points are −0.05 and +0.05. That is, when the vector is smaller than −0.05, the vector is compressed as 0; when the vector is between −0.05 and +0.05, the vector is compressed as 1; and when the vector is larger than +0.05, the vector is compressed as 2.

Figure 6:
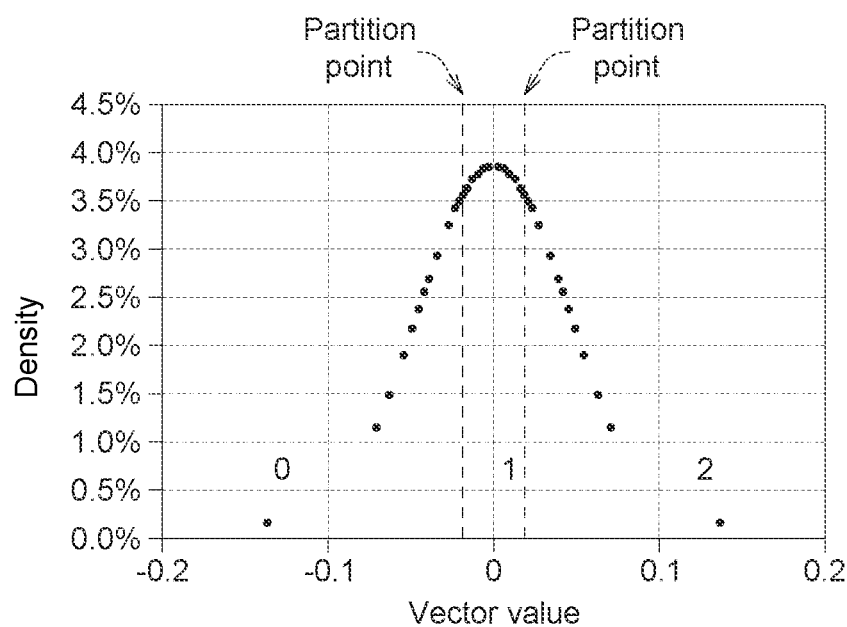
FIG. 6 shows data compression result of the data-equal-quantity compression according to the first embodiment of the application.

FIG. 6 shows data compression result of the data-equal-quantity compression according to the first embodiment of the application. As shown in FIG. 6, data may be compressed by data-equal-quantity into m parts (m may be 2, 3, 4, or any positive integer). FIG. 6 shows the data vectors are compressed into 3 states (0 or 1 or 2) by data-equal-quantity compression. After data-equal-quantity compression, about one-third of the data vectors are compressed as 0, about one-third of the data vectors are compressed as 1, and about one-third of the data vectors are compressed as 2. The partition points are decided based on data distribution. As shown in FIG. 6, data distribution is much even.

From the above description, in the first embodiment of the application, by using the data-equal-quantity compression, data distribution is much even.

In the first embodiment of the application, the dimension implementation uses the Hamming distance calculation, which is suitable in low resolution database. Usually, the dimension implementation has better results under three-bit resolution (8 states or fewer states). In the first embodiment of the application, the system storage capacity requirement is not high and calculation is fast.

Further, in the first embodiment of the application, data partition (i.e. data compression) is helpful in lowering the resolution. As described above, data partition may be data-equal-quantity compression, dimension-equal-quantity compression or other partition (for example but not limited by, exponential distance partition). In data partition, the data vectors may be partitioned into m states, wherein m may be smaller than or equal to 8 (three-bit resolution).

In the first embodiment of the application, data-equal-quantity compression may have large application, stability and better effects.

Second Embodiment

Figure 7A:
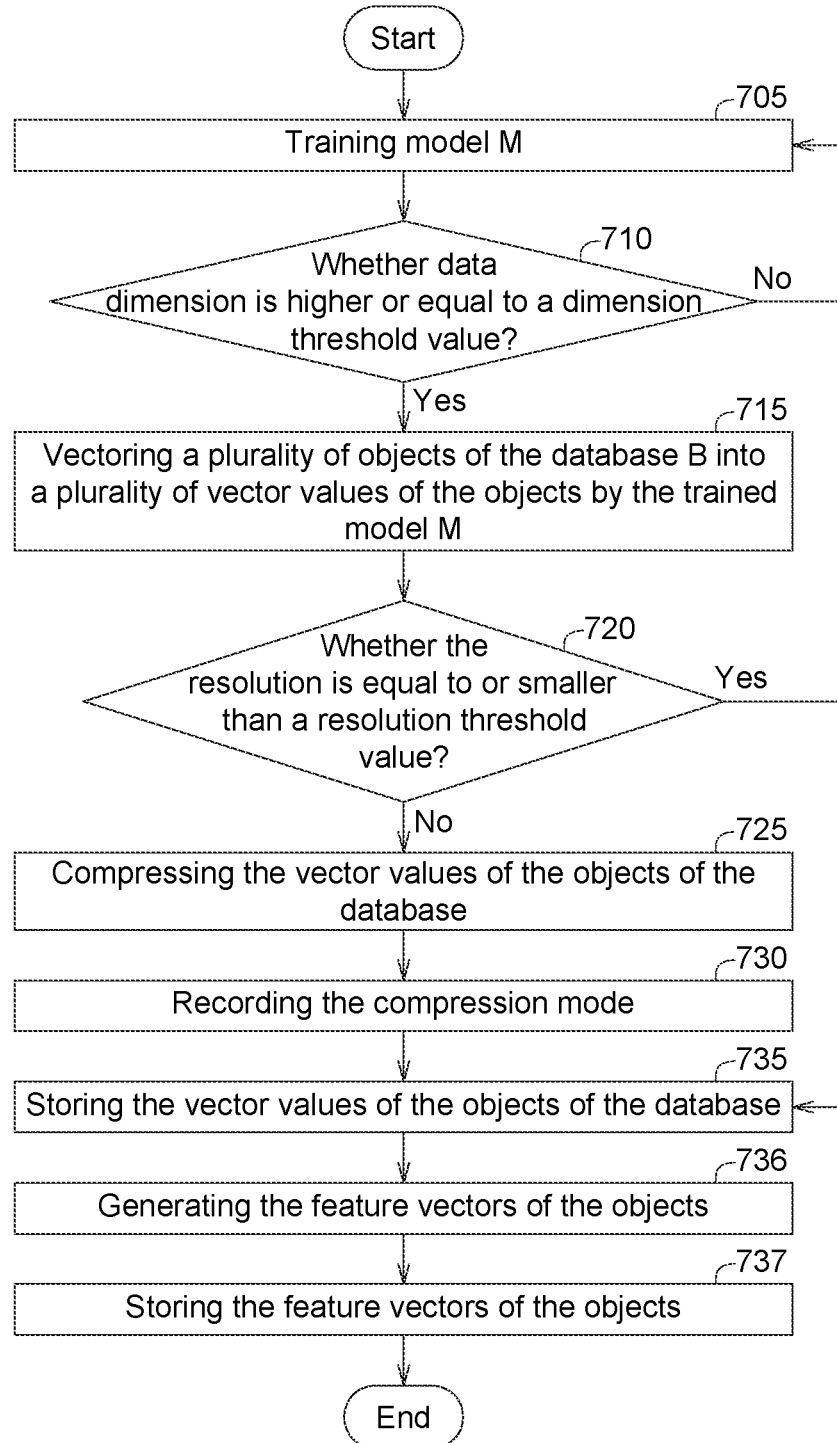
FIG. 7A shows a flow chart for vector database configuration according to a second embodiment of the application.
Figure 7B:
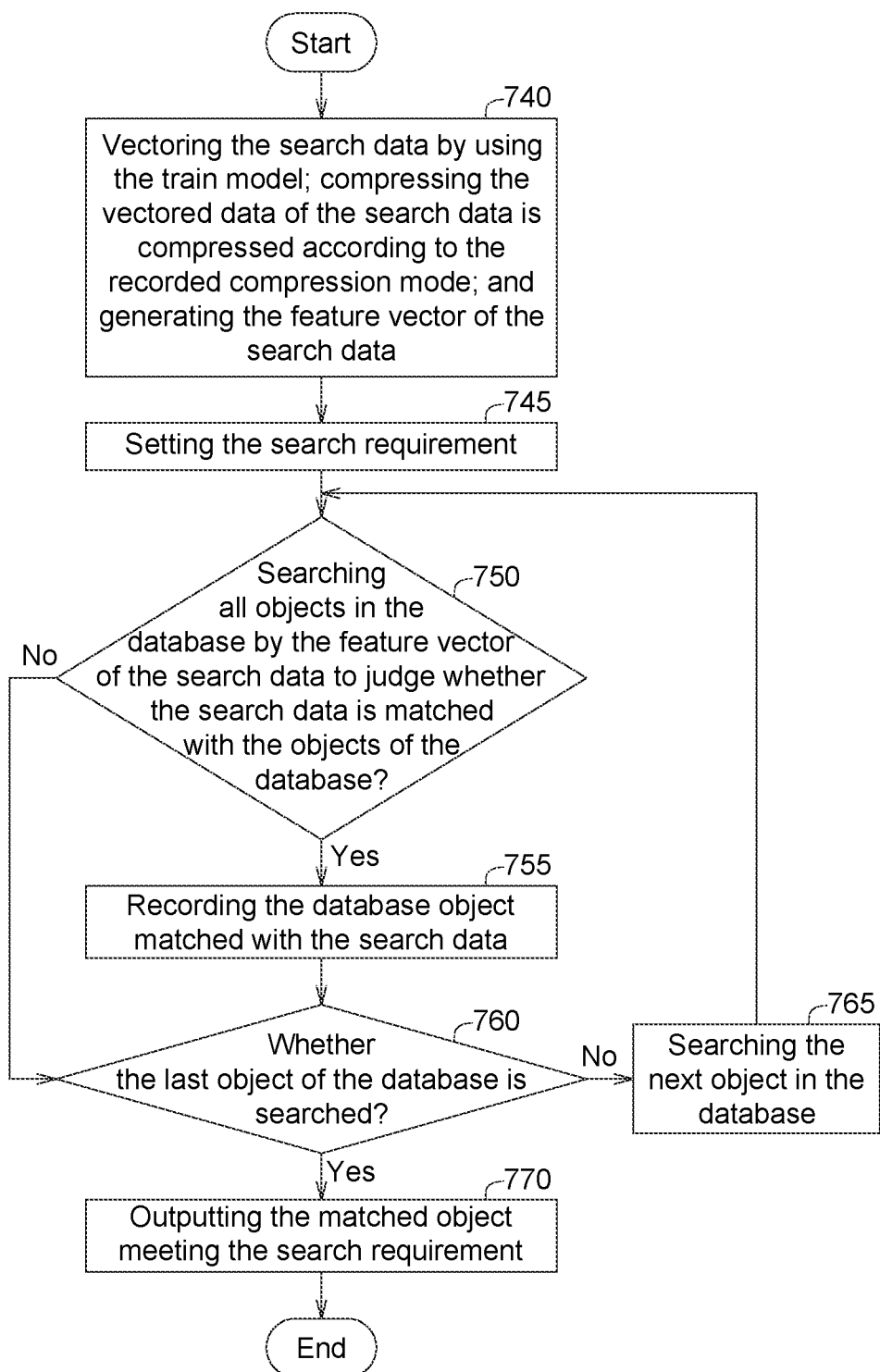
FIG. 7B shows a flow chart for data search according to the second embodiment of the application.

FIG. 7A shows a flow chart for vector database configuration according to a second embodiment of the application. FIG. 7B shows a flow chart for data search according to the second embodiment of the application.

Steps 705-735 in FIG. 7A are the same as or similar with the steps 105-135 in FIG. 1A and details thereof are omitted here.

In the step 736, respective feature vectors (or called representative vectors) of each of the objects are generated. Details are as follows.

In the second embodiment of the application, in dimension implementation, the human face image database is as an example, but the application is not limited by this. In the human face image database, each person has a lot of face images. The trained model vectors each face images of the same person to generate multi-dimension vectors. The feature vectors of the person is generated based on most-common value "MODE" in each dimension on the multi-dimension vectors of the face images of the person.

For example, in the database B, the feature vectors of the person "a" may be represented as: $(Ba_1, Ba_2, \ldots Ba_n)$, wherein $Ba_i=\text{MODE}(Ba1_i, Ba2_i, Ba3_i \ldots )$, i=1~n. The function or the parameter "MODE" refers to the most-common value among the values. In the same dimension, when there are more than one values having most common, any one of the most common values may be used as the feature vector, or in other embodiment, the smallest among the most common values may be used as the feature vector. The feature vectors of the search data are generated in the same or the similar way.

For easy understanding, table 3 shows an example for generation of the feature vectors, which is not to limit the application.

TABLE 3

| Code | Ba1 | Ba2 | Ba3 | Ba4 | Ba5 | Mode(Ba) |
|---|---|---|---|---|---|---|
| person | a | a | a | a | a | N/A |
| image | 1 | 2 | 3 | 4 | 5 | N/A |
| D1 (vector 1) | 0 | 0 | 0 | 1 | 0 | 0 |
| D2 (vector 2) | 2 | 2 | 2 | 3 | 2 | 2 |
| D3 (vector 3) | 1 | 2 | 3 | 2 | 3 | 2 or 3 |
| . . . | . . . | . . . | . . . | . . . | . . . | . . . |
| D510 (vector 510) | 2 | 3 | 1 | 1 | 1 | 1 |
| D511 (vector 511) | 3 | 0 | 2 | 1 | 2 | 2 |
| D512 (vector 512) | 0 | 3 | 3 | 3 | 3 | 3 |

In the table 3, after model vectorization, the first image of the person "a" has a vector: (0, 2, 1, . . . , 2, 3, 0) and others are so on.

The first dimension D1 of the five images of the person "a" are 0, 0, 0, 1 and 0, respectively, wherein the value "0" has most counts (i.e. most common). Thus, the first element (the first dimension) $Ba_1$ of the feature vector of the person "a" is 0. Similarly, the second element $Ba_2$ (the second dimension) of the feature vector of the person "a" is 2; the third element Baa (the third dimension) of the feature vector of the person "a" is 2 or 3; the $510^{th}$ element $Ba_{510}$ (the $510^{th}$ dimension) of the feature vector of the person "a" is 1; the $511^{th}$ element $Ba_{511}$ (the $511^{th}$ dimension) of the feature vector of the person "a" is 2; and the 512$^{th}$ element Ba$_{512}$ (the 512$^{th}$ dimension) of the feature vector of the person "a" is 3.

Thus, the feature vector of the person "a" (the object "a") is (Ba$_1$, Ba$_2$, . . . Ba$_n$)=(0, 2, (2 or 3), . . . , 1, 2, 3).

In the step 737, the respective feature vectors of all the objects found in the step 736 are stored and the database is named as database "BM", to distinguish from the original database B.

Steps 740-770 of FIG. 7B are the same or similar with the steps 140-170 of FIG. 1B, and thus the details are omitted here. However, in the step 740, the search data is vectored by using the train model M; the vectored data of the search data is compressed according to the compression mode; and the feature vector of the search data is generated in the similar way. In the following steps, the feature vector of the search data is used to search the database "BM".

Data search of the second embodiment of the application is described. Human face recognition is as an example which is not to limit the application. In the human face database, after model vectorization and generation of the feature vector, the feature vector of the person a is represented as: (Ba1, Ba2, . . . Ba$_n$). The human face image of the person x is fetched by the camera. After model vectorization, the feature vector of the person x is represented as: (Bx$_1$, Bx$_2$, . . . Bx$_n$). In the step 750, the feature vector (Bx$_1$, Bx$_2$, . . . Bx$_n$) of the person "x" is used for searching or comparing the feature vector (Ba$_1$, Ba$_2$, . . . Ba$_n$) of the person a. When Bx$_1$ is matched with Ba$_1$, the first dimension is matched; and when Bx$_1$ is not matched with Ba$_1$, the first dimension is not matched. After all dimensions are compared, the matched dimension quantity is found. When the match dimensions between the feature vector of the person x and the feature vector of the person a are higher than the search requirement (for example but not limited by, 300 dimension), then the person x is matched the person a, that is, after human face recognition, the person x and the person a are the same person and vice versa.

In one embodiment of the application, each dimension of the feature vector of the search data has several vector states and the number of the vector states is equal to or lower than 3 bits or 8 bits. Also, each dimension of the feature vector of the objects of the database has several vector states and the number of the vector states is equal to or lower than 3 bits or 8 bits.

Third Embodiment

Figure 8A:
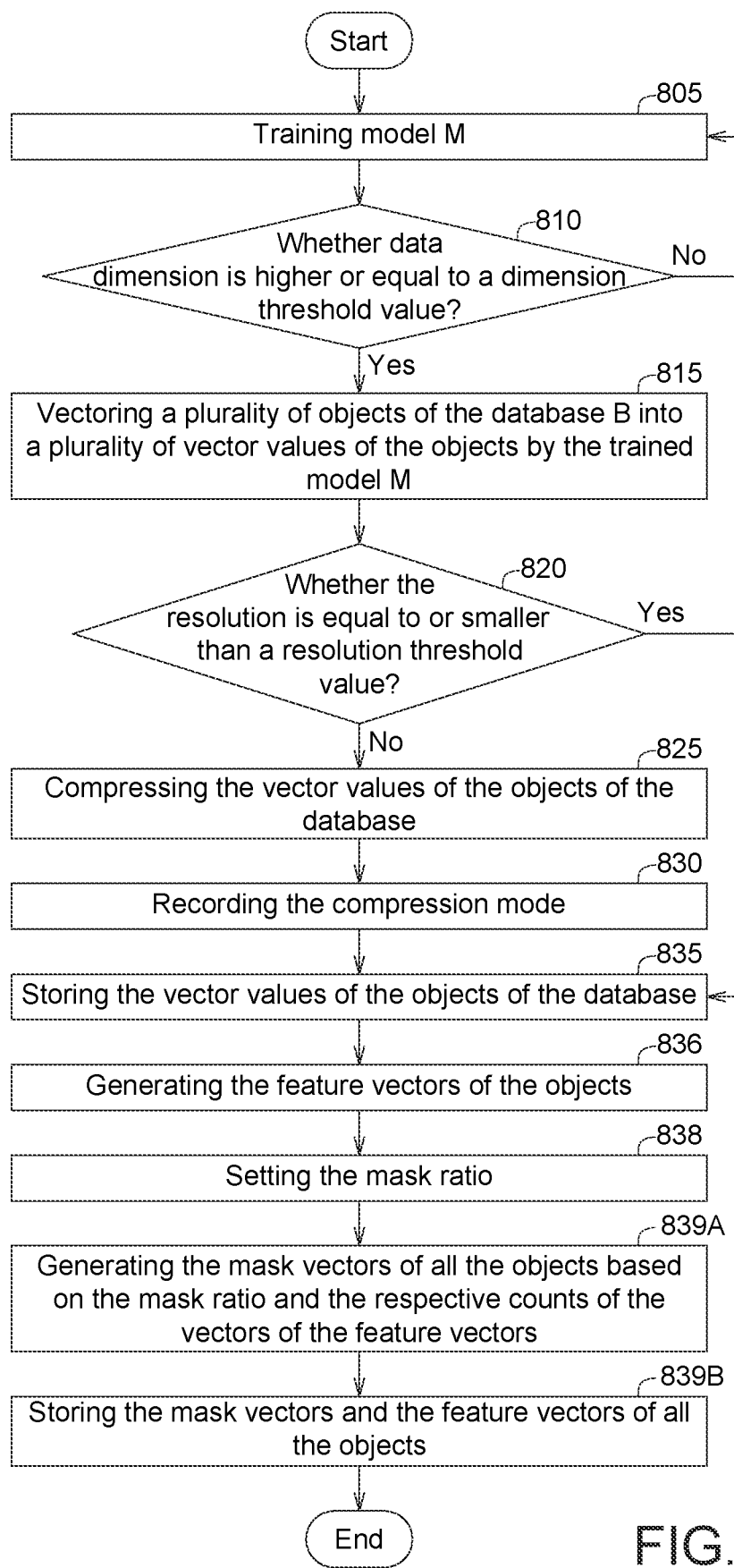
FIG. 8A shows a flow chart for vector database configuration according to a third embodiment of the application.
Figure 8B:
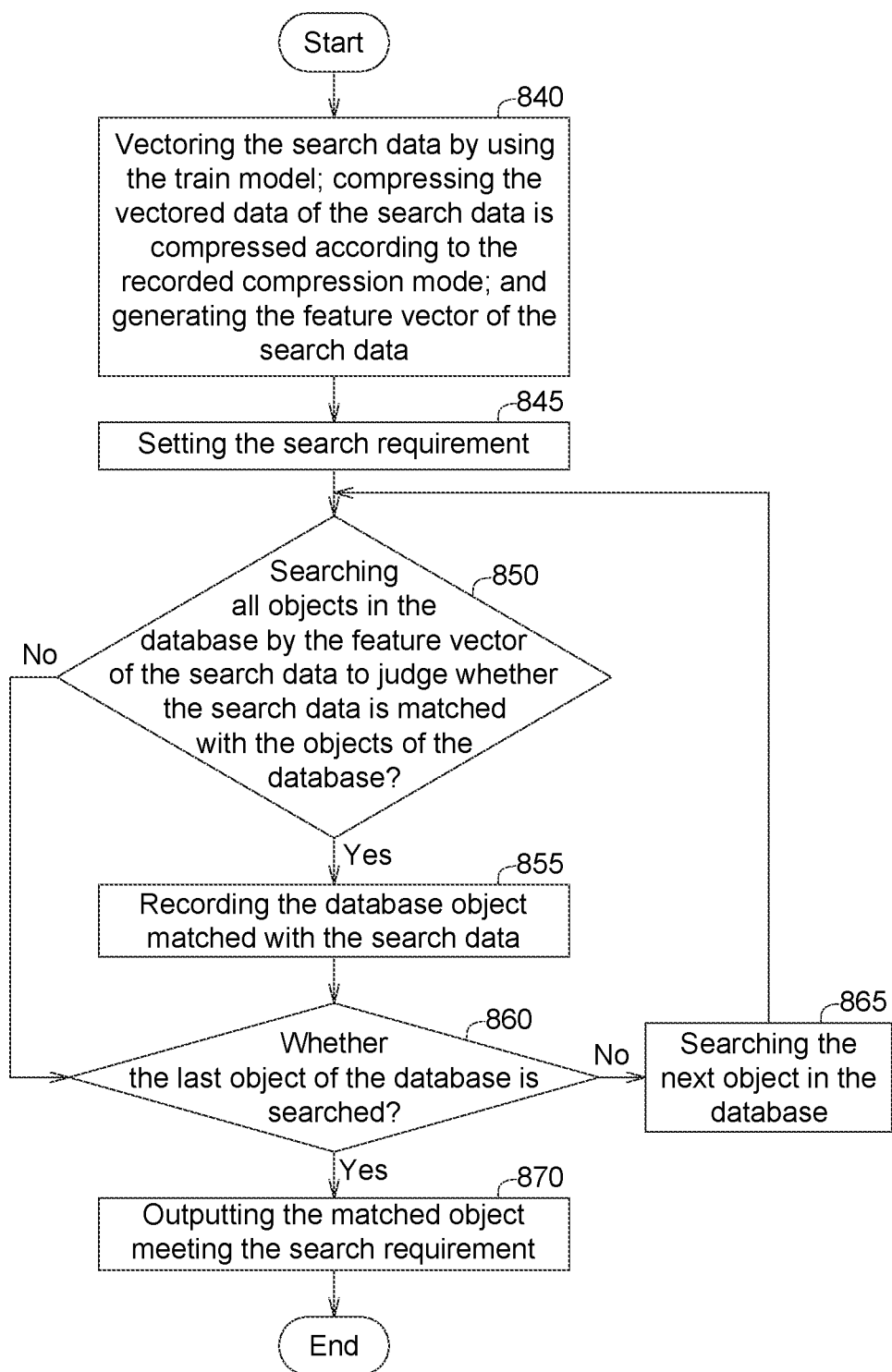
FIG. 8B shows a flow chart for data search according to the third embodiment of the application.

FIG. 8A shows a flow chart for vector database configuration according to a third embodiment of the application. FIG. 8B shows a flow chart for data search according to the third embodiment of the application.

Steps 805-836 in FIG. 8A are the same as or similar with the steps 705-736 in FIG. 7A and details thereof are omitted here.

In the step 838, a mask ratio is set. The third embodiment of the application masks the elements of the feature vector based on the mask ratio for improving match confidence.

Details of the step 838 are as follows.

In the example, the database has 19 data of the object a (for example, 19 human face images of the person a). After vectorization, the 19 dimension vectors of the object a are as the table 4.

TABLE 4

| | D1 | D2 | D3 | D4 | D5 | D6 | D7 | D7 | D9 | D10 |
|---|---|---|---|---|---|---|---|---|---|---|
| Ba1 | 1 | 1 | 1 | 0 | 1 | 0 | 1 | 1 | 1 | 1 |
| Ba2 | 0 | 0 | 1 | 0 | 1 | 0 | 0 | 0 | 0 | 0 |
| Ba3 | 1 | 0 | 1 | 1 | 1 | 1 | 1 | 0 | 1 | 0 |
| Ba4 | 1 | 0 | 1 | 0 | 1 | 0 | 1 | 0 | 1 | 0 |
| Ba5 | 0 | 0 | 1 | 0 | 1 | 0 | 0 | 0 | 1 | 0 |
| Ba6 | 0 | 0 | 1 | 0 | 1 | 0 | 0 | 0 | 1 | 0 |
| Ba7 | 1 | 0 | 1 | 1 | 1 | 1 | 1 | 1 | 1 | 0 |
| Ba8 | 1 | 0 | 1 | 1 | 1 | 1 | 0 | 0 | 1 | 0 |
| Ba9 | 1 | 0 | 1 | 1 | 1 | 0 | 1 | 0 | 1 | 0 |
| Ba10 | 1 | 0 | 1 | 1 | 1 | 0 | 1 | 1 | 1 | 0 |
| Ba11 | 0 | 0 | 0 | 0 | 0 | 0 | 0 | 0 | 0 | 0 |
| Ba12 | 0 | 0 | 1 | 0 | 0 | 0 | 0 | 0 | 0 | 0 |
| Ba13 | 1 | 0 | 1 | 1 | 1 | 0 | 1 | 1 | 1 | 0 |
| Ba14 | 1 | 0 | 1 | 1 | 1 | 0 | 1 | 1 | 1 | 0 |
| Ba15 | 1 | 1 | 1 | 1 | 1 | 0 | 1 | 1 | 1 | 0 |
| Ba16 | 1 | 0 | 1 | 1 | 1 | 0 | 1 | 1 | 1 | 0 |
| Ba17 | 0 | 0 | 1 | 0 | 0 | 0 | 0 | 0 | 0 | 0 |
| Ba18 | 0 | 0 | 1 | 0 | 0 | 0 | 0 | 0 | 0 | 0 |
| Ba19 | 1 | 0 | 1 | 1 | 1 | 1 | 1 | 1 | 1 | 0 |
| Ba | 1 | 0 | 1 | 1 | 1 | 0 | 1 | 0 | 1 | 0 |
| counts | 12 | 17 | 18 | 10 | 15 | 15 | 11 | 11 | 14 | 18 |
| mask | 0 | 1 | 1 | 0 | 1 | 1 | 0 | 0 | 1 | 1 |

In the third embodiment of the application, the feature vector of the person a is (1, 0, 1, 1, 1, 0, 1, 0, 1, 0). The respective counts of the ten elements of the feature vector are 12, 17, 18, 10, 15, 15, 11, 11, 14 and 18, respectively. That is, the first element Ba1 (the first dimension) of the feature vector of the person a is the value "1", which has counts of 12. Others are so on.

When the mask ratio is 40%, it means that 40% of the elements of the feature vector are masked. In the table 4, the feature vector includes 10 elements (ten dimensions), 10*40%=4. That is, among the feature vector, the four elements having low counts are to be masked. In the table 4, the four elements having low counts are D1 (having counts of 12), D4 (having counts of 10), D7 (having counts of 11) and D8 (having counts of 11). Thus, the mask bits of the dimensions D1, D4, D7 and D8 are set as 0 while the mask bits of the other dimensions are set as 1. The mask vector of the object a is: (0, 1, 1, 0, 1, 1, 0, 0, 1, 1). If the vector is masked, then the masked vector is not used in the dimension match.

That is, in the third embodiment of the application, the vectors having low counts and low confidence are masked.

In the step 839A, the mask vectors of all the objects are generated based on the mask ratio and the respective counts of the vectors of the feature vectors.

In the step 839B, the mask vectors and the feature vectors of all the objects are stored in the database BMM, which is distinguished from the database BM.

Steps 840-870 of FIG. 8B are the same or similar with the steps 740-770 of FIG. 7B and thus the details are omitted here. However, in the step 840, the search data is vectored by using the train model M; the vectored data of the search data is compressed according to the compression mode; and the feature vector of the search data is generated in the similar way. In the following steps, the feature vector of the search data is used to search the database "BMM".

Data search of the third embodiment of the application is described. Human face recognition is as an example which is not to limit the application. In the human face database, after model vectorization and generation of the feature vector and the mask vector, the feature vector of the person a is represented as: (Ba$_1$, Ba$_2$, . . . Ba$_n$) and the mask vector of the person a is represented as: (Ba$_{1M}$, Ba$_{2M}$, . . . Ba$_{nM}$). The human face image of the person x is fetched by the camera. After model vectorization, the feature vector of the person x is represented as: $(Bx_1, Bx_2, \ldots Bx_n)$. In the step 850, the feature vector $(Bx_1, Bx_2, \ldots Bx_n)$ of the person "x" is used for searching or comparing the feature vector $(Ba_1, Ba_2, \ldots Ba_n)$ of the person a with consideration of the mask vector of the person a. When $Bx_1$ is matched with $Ba_1$ and the vector $Ba_1$ is not masked, the first dimension is matched; when $Bx_1$ is not matched with $Ba_1$ (no matter the vector $Ba_1$ is masked or not), the first dimension is not matched; and when the vector $Ba_1$ is masked (no matter $Bx_1$ is matched with $Ba_1$ or not), the first dimension is not matched. After all dimensions are compared, the matched dimension quantity is found. When the match dimensions between the feature vector of the person x and the feature vector of the person a are higher than the search requirement (for example but not limited by, 300 dimension), then the person x is matched the person a, that is, after human face recognition, the person x and the person a are the same person and vice versa.

In the third embodiment of the application, via masking vectors having low confidence, the confidence is improved, the search speed is fast and the storage capacity requirement is reduced.

In another embodiment of the application, the memory device implements the data search method of the above embodiments. Details are as below.

In another embodiment of the application, the vector data and the feature vector are stored in the memory cells of the memory device.

Figure 9:
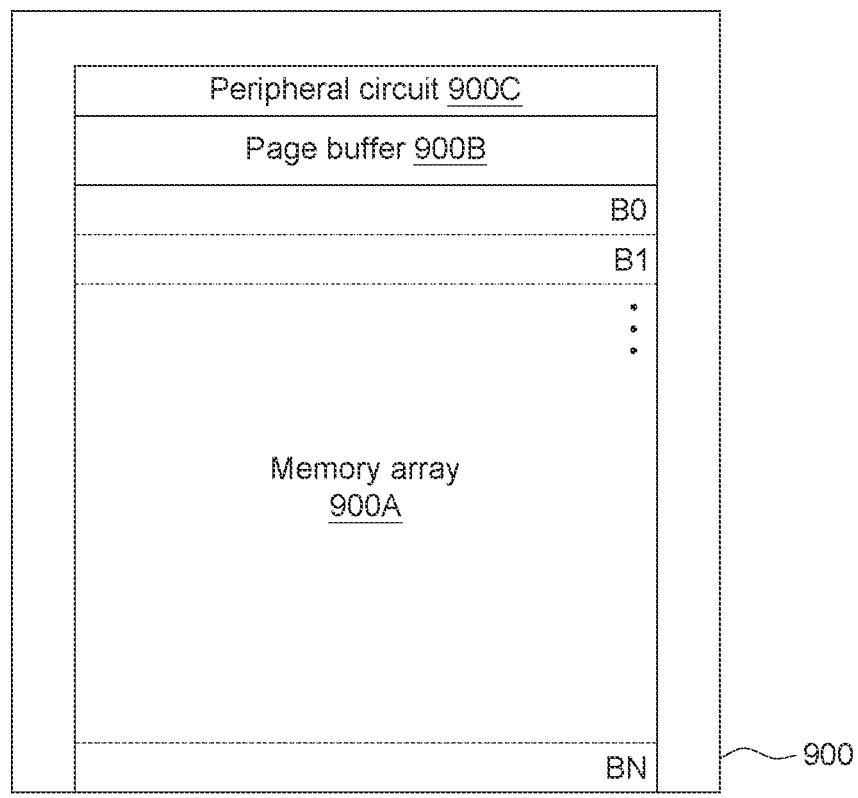
FIG. 9 shows a memory device according to another embodiment of the application.

FIG. 9 shows the memory device according to another embodiment of the application. The memory device includes a plurality of memory planes 900. As shown in FIG. 9, the memory plane 900 includes a memory array 900A, a page buffer 900B and a peripheral circuit 900C. The peripheral circuit 900C is coupled to the memory array 900A and the page buffer 900B. The page buffer 900B is coupled to the bit lines of the memory array 900A. The page buffer 900B includes a plurality of operation units for executing logic operations. The page buffer 900B further includes a sensing amplifier for executing current sensing, and whether data search is matched is based on a current sensing result. Further, The page buffer 900B optionally includes an analog-to-digital converter for converting the analog current sensing result of the sensing amplifier into a digital signal for determining whether data search is matched.

There are 512 dimensions as an example, but the application is not limited by. The feature vector of the person a has 512 dimensions and thus, the feature vector of the person a is stored in the first 512 memory cells along the word line. The feature vector of another person b has 512 dimensions and thus, the feature vector of the person b is stored in the next 512 memory cells along the word line. Others are so on.

The memory array 900A includes a plurality of blocks B0~BN (N being a positive integer, for example but not limited by, N being between 500~20000), each block including a plurality of memory cells located on intersections of a plurality of word lines and a plurality of bit lines. For example but not limited by, when each word line has 128k memory cells, each word line may store 128k/512=256 persons' feature vectors.

In prior memory reading, in data read/write, one memory block is selected for data read/write.

However, in one embodiment of the application, in data searching, a plurality of memory blocks and a plurality of word lines are selected for accumulating bit line currents to perform in memory computing (IMC).

For simplicity, data search on two memory blocks is taken as an example which is not to limit the application.

Figure 10:
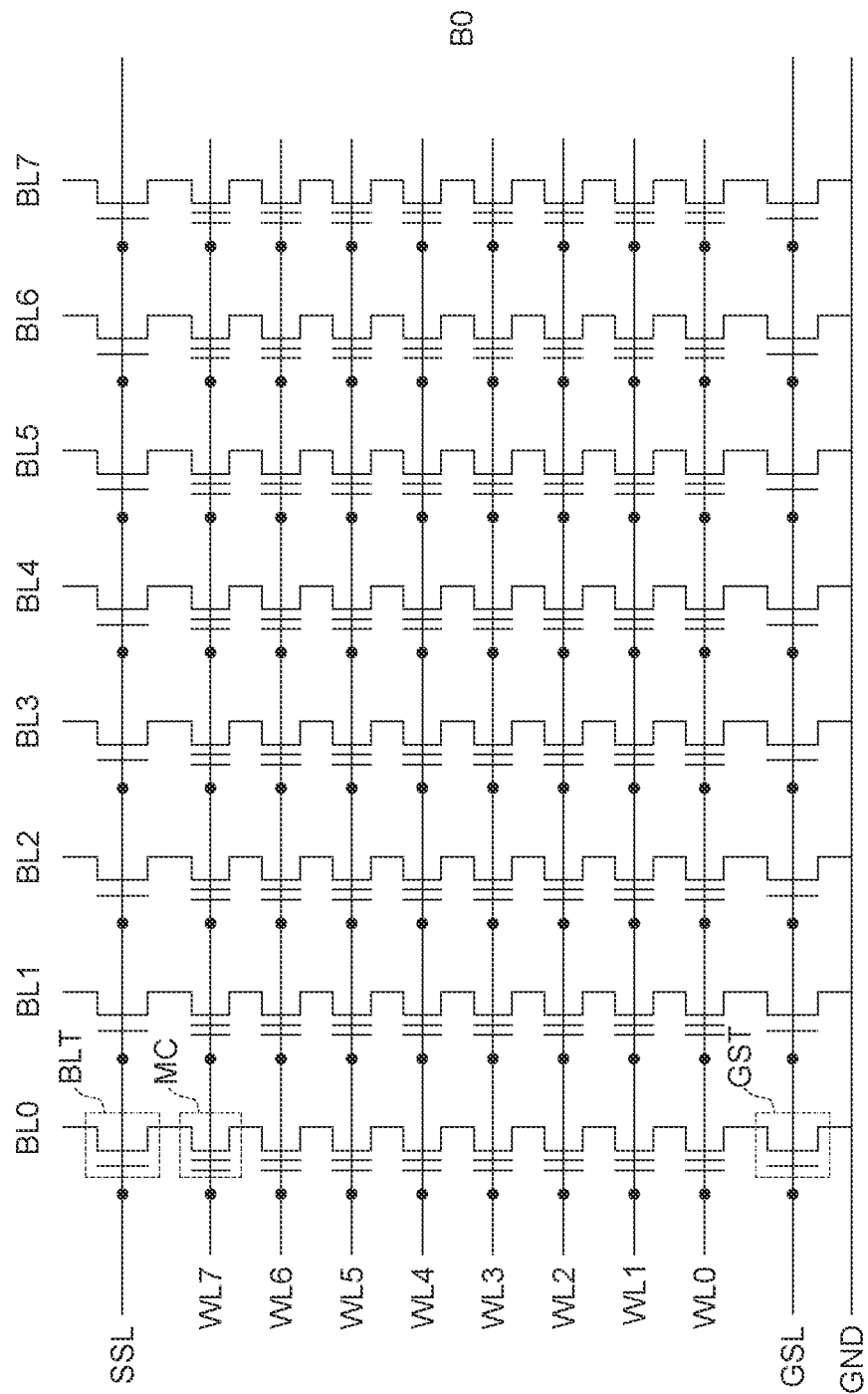
FIG. 10 shows a circuit structure of a memory block according to one embodiment of the application.

FIG. 10 shows a circuit structure of a memory block according to one embodiment of the application. The memory block B0 is taken as an example and the circuit structure is similar for other memory blocks. As shown in FIG. 10, the memory block B0 includes a plurality of memory cells MC, a plurality of bit line transistors BLT and a plurality of ground select transistors GST. FIG. 10 shows eight word lines WL0~WL7 and eight bit lines BL0~BL7 which is not to limit the application.

The memory cells MC are on intersections of the word lines WL0~WL7 and the bit lines BL0~BL7. The bit line transistors BLT include: gates receiving the string select line signal SSL, terminals coupled to the bit lines BL0~BL7 and the other terminals coupled to the memory cells MC.

The ground select transistors GST include: gates receiving the ground select line signal GSL, terminals coupled to GND and the other terminals coupled to the memory cells MC.

In one embodiment of the application, the memory cells may store the feature vectors of the database objects. The search data is input via the bit lines into the memory cells MC for data comparison and data search.

Figure 11:
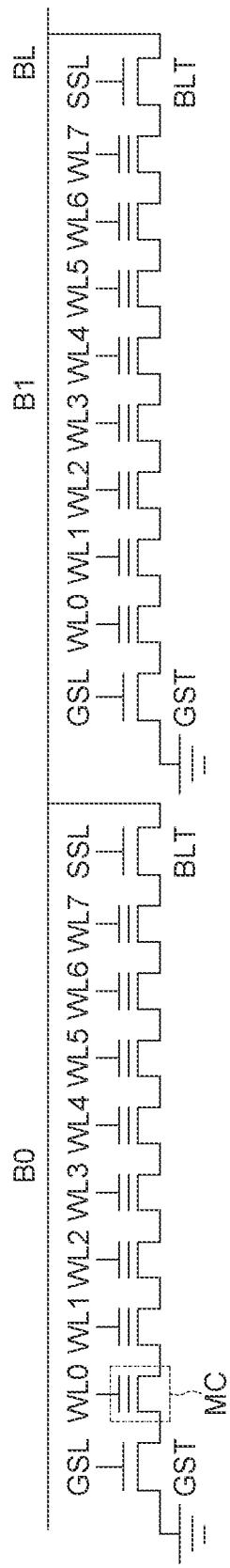
FIG. 11 shows two memory blocks according to one embodiment of the application.

FIG. 11 shows two memory blocks according to one embodiment of the application. As shown in FIG. 11, when the bit line transistor BLT of the memory block is turned on, the corresponding memory block is selected. As shown in FIG. 11, the two memory blocks may be concurrently selected. Also, in other possible example of the application, more than two memory blocks may be concurrently selected.

Figure 12:
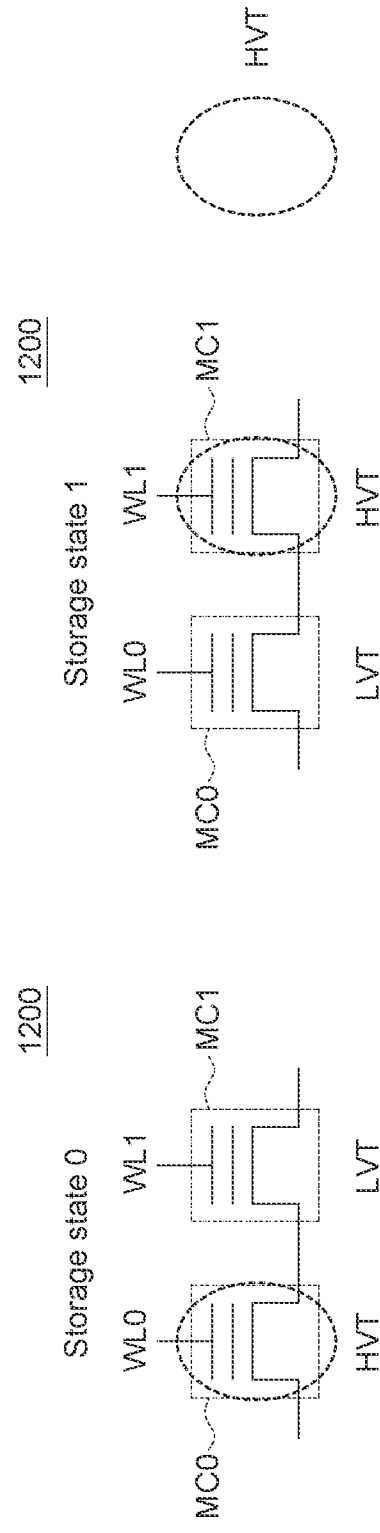
FIG. 12 shows the storage states 0 and 1 of the memory cell group according to one embodiment of the application.

FIG. 12 shows the storage states 0 and 1 of the memory cell group according to one embodiment of the application. In here, the memory cell group includes two adjacent or non-adjacent memory cells coupled to the same bit line. FIG. 12 shows that the memory cell group 1200 includes two adjacent memory cells MC0 and MC1, which is not to limit the application.

When the memory cells MC0 and MC1 are programmed into high threshold voltage (HVT) and low threshold voltage (LVT) respectively, the memory cell group 1200 has the storage state 0. On the contrary, when the memory cells MC0 and MC1 are programmed into low threshold voltage (LVT) and high threshold voltage (HVT) respectively, the memory cell group 1200 has the storage state 1.

Figure 13:
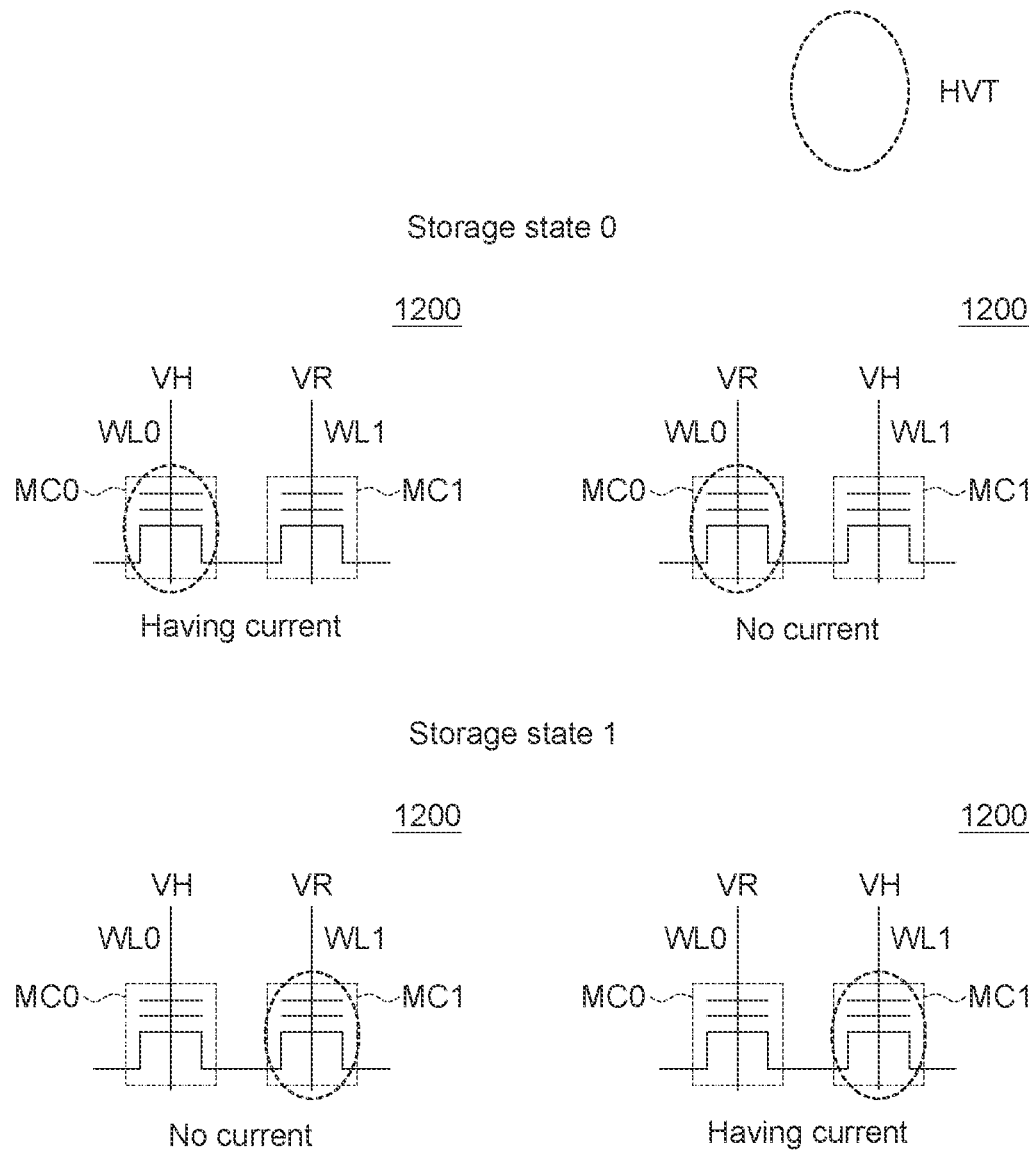
FIG. 13 shows data reading (data search) on the memory cell group according to one embodiment of the application.

FIG. 13 shows data reading (data search) on the memory cell group according to one embodiment of the application. In data reading (data search), when the search data is 1 and the storage state is 1, the search is matched; and when the search data is 0 and the storage state is 0, the search is matched. On the contrary, when the search data is 1 and the storage state is 0, the search is m is-matched; and when the search data is 0 and the storage state is 1, the search is m is-matched.

According to one embodiment of the application, the search data is encoded into a search voltage group (at least including a first search voltage and a second search voltage). For example but not limited by, the search data 0 is encoded into the first search voltage having the high voltage VH and the second search voltage having the low voltage VR; and the search data 1 is encoded into the first search voltage having the low voltage VR and the second search voltage having the high voltage VH. Wherein the first search voltage and the second search voltage are applied to the gates of the two memory cells of the memory cell group via different word lines. In the following, the first search voltage is applied to the gate of the memory cell MC0; and the second search voltage is applied to the gate of the memory cell MC1.

In case that the memory cell group 1200 has storage state 0, (1) when the first search voltage having the high voltage VH and the second search voltage having the low voltage VR are applied into the gates of the memory cells MC0 and MC1, respectively, the memory cells MC0 and MC1 are both conducted and thus the memory cell group 1200 generates the current; and (2) when the first search voltage having the low voltage VR and the second search voltage having the high voltage VH are applied into the gates of the memory cells MC0 and MC1, respectively, the memory cells MC0 and MC1 are both misconducted and thus the memory cell group 1200 does not generates the current.

That is, in case that the memory cell group 1200 has storage state 0, when the search data is 0, the memory cell group 1200 generates the current (the search is matched); and when the search data is 1, the memory cell group 1200 does not generate the current (the search is mismatched).

In case that the memory cell group 1200 has storage state 1, (1) when the first search voltage having the high voltage VH and the second search voltage having the low voltage VR are applied into the gates of the memory cells MC0 and MC1, respectively, the memory cells MC0 and MC1 are both misconducted and thus the memory cell group 1200 does not generates the current; and (2) when the first search voltage having the low voltage VR and the second search voltage having the high voltage VH are applied into the gates of the memory cells MC0 and MC1, respectively, the memory cells MC0 and MC1 are both conducted and thus the memory cell group 1200 generates the current.

That is, in case that the memory cell group 1200 has storage state 1, when the search data is 0, the memory cell group 1200 does not generate the current (the search is mismatched); and when the search data is 1, the memory cell group 1200 generates the current (the search is matched).

Figure 14A:
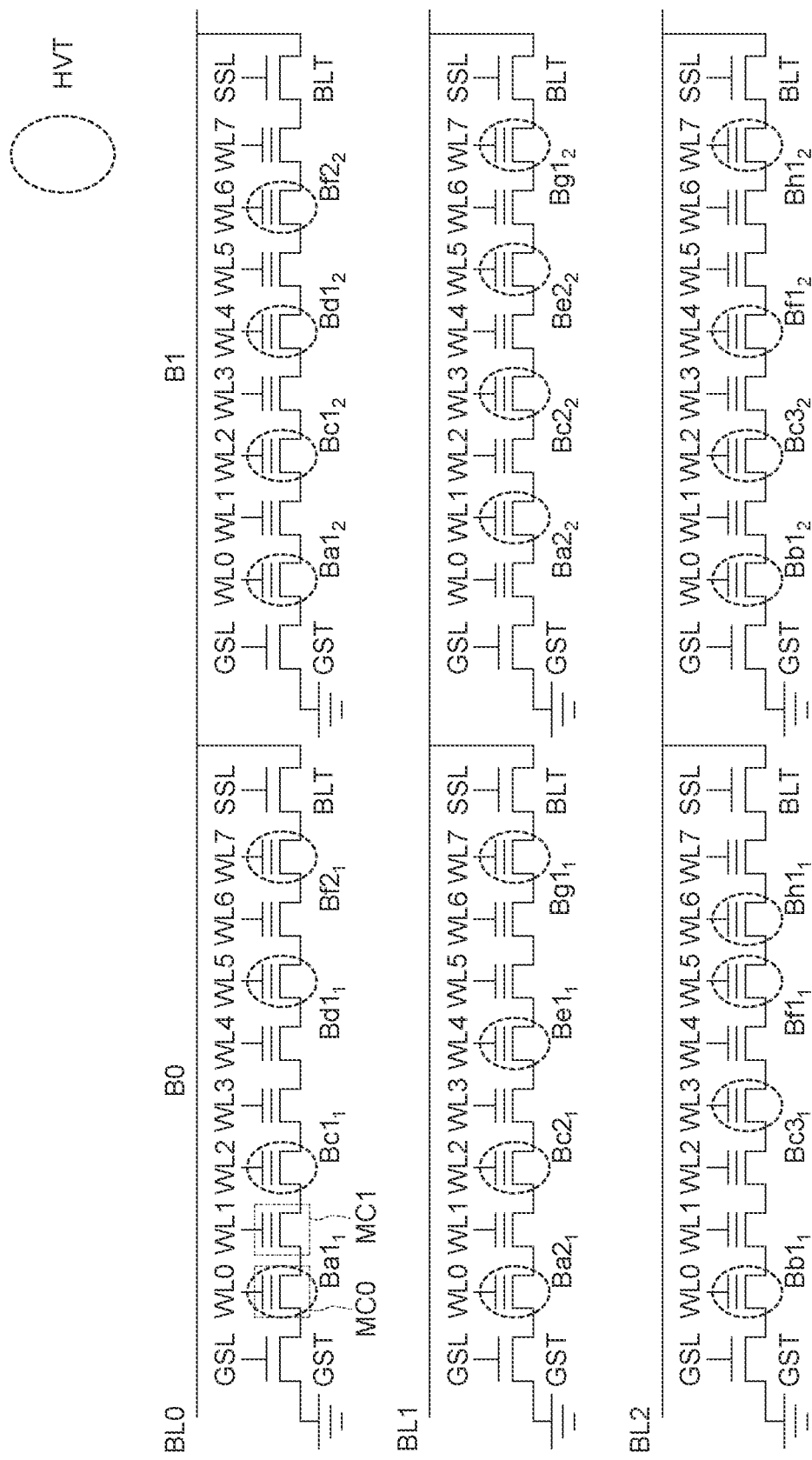
FIG. 14A shows storing the feature vectors in the memory array according to one embodiment of the application.

FIG. 14A shows storing the feature vectors in the memory array according to one embodiment of the application. In FIG. 14A, "$Ba_1$" refers to the feature vector of the first image of the object a; "$Ba1_1$" refers to the first dimension vector of the feature vector of the first image of the object a; and "$Ba1_2$" refers to the second dimension vector of the feature vector of the first image of the object a. Others are so on.

In storages, the memory cells coupled to the bit line BL0 may store the vectors of the objects a, b, d and f. Others are so on.

Further, as described above, two memory cells are used to store one dimension vector of the feature vector of the object. For example, in FIG. 14A, the memory cells MC0 and MC1 store one dimension vector $Ba1_1$ of the feature vector of the object a, wherein the memory cell MC0 has high threshold voltage (HVT) and the memory cell MC1 has low threshold voltage (LVT). That is, one dimension vector $Ba1_1$ of the feature vector of the object a is the storage state 0. Others are so on.

Figure 14B:
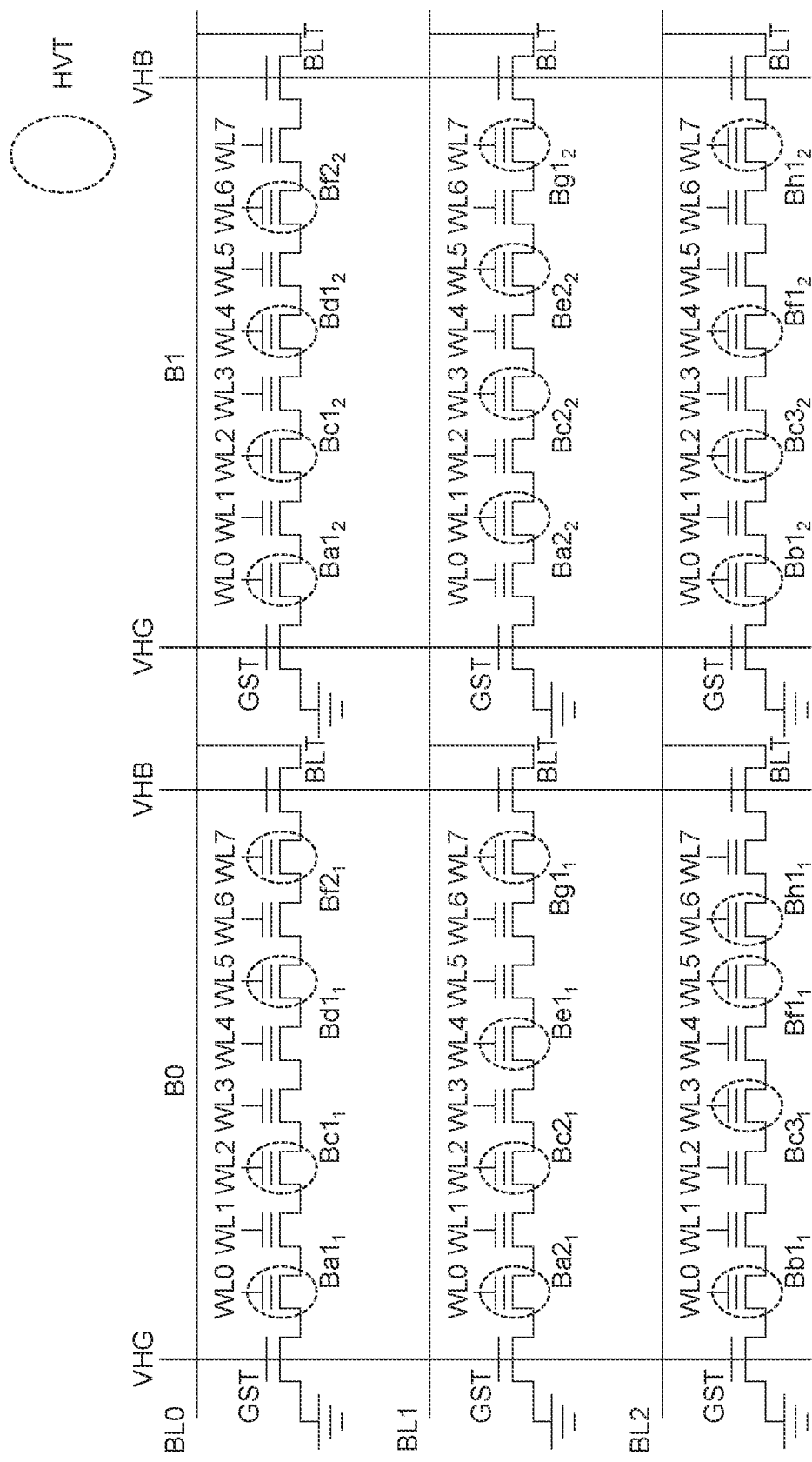
FIG. 14B shows one step of data search according to one embodiment of the application.

FIG. 14B shows one step of data search according to one embodiment of the application. As shown in FIG. 14B, before data search, a reference voltage VHB is applied to the bit line transistors BLT to conduct the bit line transistors BLT and a reference voltage VHG is applied to the ground select transistors GST to conduct the ground select transistors GST. When the corresponding bit line transistor BLT and the corresponding ground select transistor GST are conducted, the corresponding memory block is selected.

From FIG. 14B, in one embodiment of the application, in data search, a plurality of memory blocks are concurrently selected by concurrently conducting a plurality of the bit line transistors BLT and a plurality of the ground select transistors GST.

If the feature vector of the object has 512 dimensions, in data search, then at least 512 memory blocks are concurrently selected.

Figure 14C:
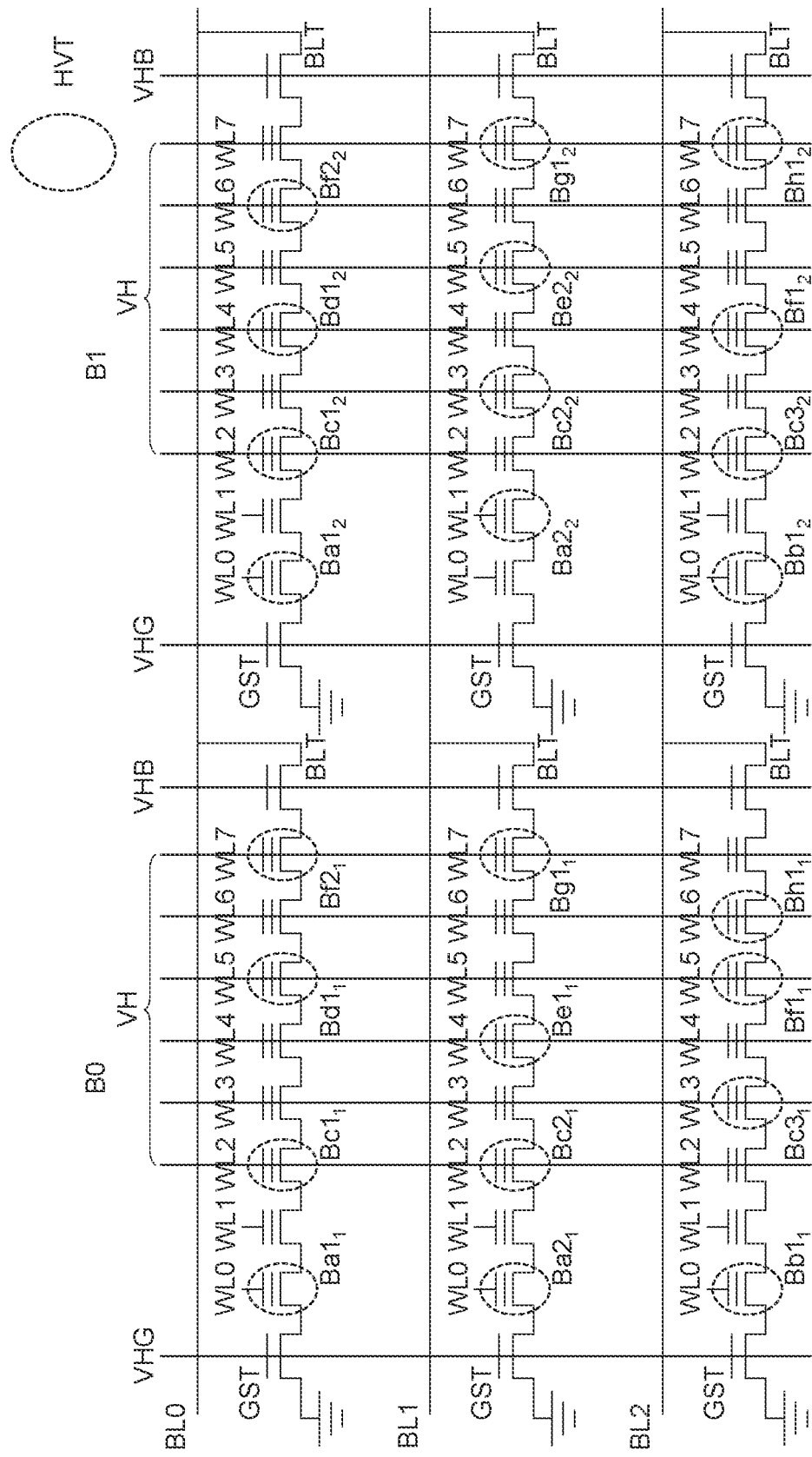
FIG. 14C shows another step of data search according to one embodiment of the application.
Figure 14D:
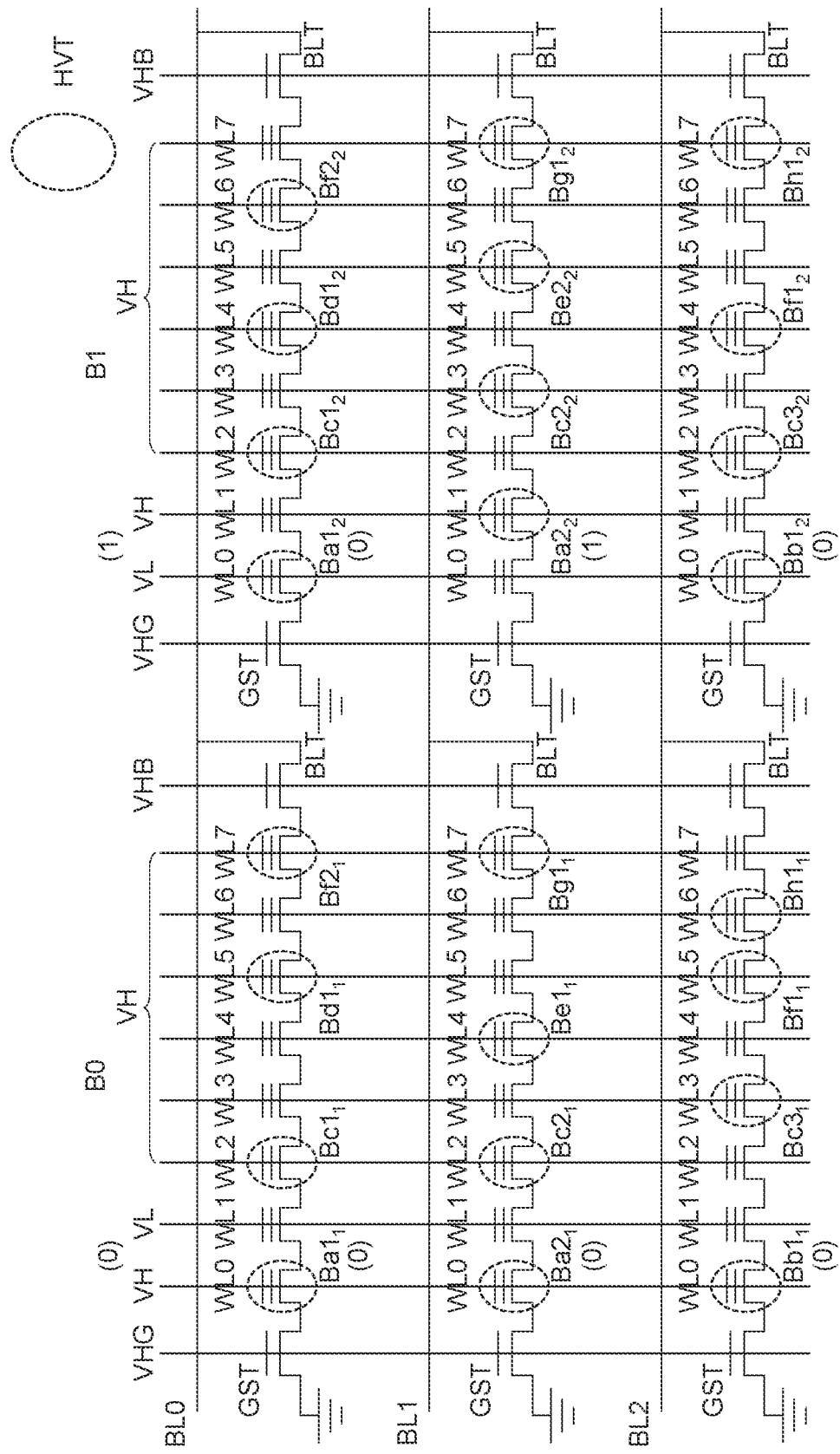
FIG. 14D shows yet another step of data search according to one embodiment of the application.

FIG. 14C shows another step of data search according to one embodiment of the application. FIG. 14D shows yet another step of data search according to one embodiment of the application. In FIG. 14C, the reference voltage VH is applied to the unselected word lines to conduct the unselected word lines. In FIG. 14D, based on the search data, the search voltages VH and VR are applied to the selected word lines. In one possible embodiment, the search voltages VH and VR may be the pass voltage and the read voltage respectively, which is not to limit the application.

For example, in the first data search, the feature vector "Ba1" of the first image of the object a, the feature vector "Ba2" of the second image of the object a and the feature vector "Bb1" of the first image of the object b are searched, then the word lines WL0 and WL1 are selected while other word lines WL2-WL7 are unselected.

As shown in FIG. 14C and FIG. 14D, in the first data search, the search voltages VH and VR (the search data is 0) are applied to the selected word lines WL0 and WL1 of the memory block B0, respectively; and the search voltages VR and VH (the search data is 1) are applied to the selected word lines WL0 and WL1 of the memory block B1, respectively.

Figure 14E:
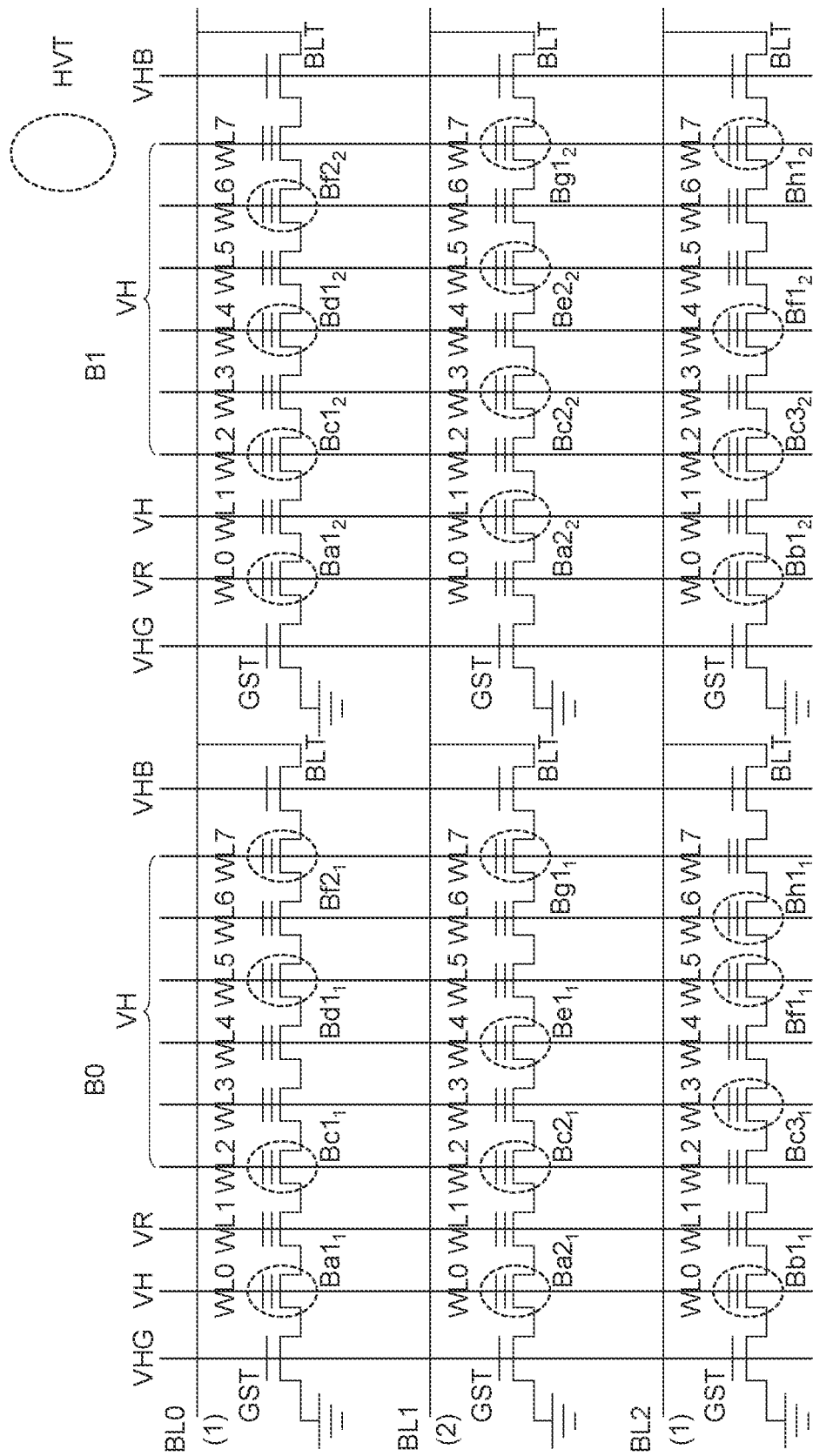
FIG. 14E shows data search result according to one embodiment of the application.

FIG. 14E shows data search result according to one embodiment of the application.

It is assumed that "Ba11"=0, "Ba12"=0, "Ba21"=0, "Ba22"=1, "Bb11"=0 and "Bb12"=0. On the bit line BL0, the memory cell group 1200 of the memory block B0 is conducted, the memory cell group 1200 of the memory block B1 is misconducted, so there is one unit current on the bit line BL0. On the bit line BL1, the memory cell group 1200 of the memory block B0 is conducted, the memory cell group 1200 of the memory block B1 is conducted, so there are two unit currents on the bit line BL1. On the bit line BL2, the memory cell group 1200 of the memory block B0 is conducted, the memory cell group 1200 of the memory block B1 is misconducted, so there is one unit current on the bit line BL2.

By so, currents from the 512 memory blocks on each of the bit lines are accumulated (i.e. the current sensing results from the sensing amplifiers of the page buffer 900B are accumulated) to generate the match result. That is, the accumulated current on the bit line BL0 refers to the data search result on the feature vector "Ba1" of the first image of the object a; the accumulated current on the bit line BL1 refers to the data search result on the feature vector "Ba1" of the second image of the object a; and the accumulated current on the bit line BL2 refers to the data search result on the feature vector "Bb1" of the first image of the object b.

When the accumulated current on the bit line is over a current threshold value, the data search result is matched; and vice versa.

In other possible embodiment of the application, the page buffer 900B optionally includes an analog-to-digital converter to convert the analog current accumulation result on the bit line into a digital signal. When the digital output signal of the analog-to-digital converter of the page buffer 900B is 1, the data search is matched and vice versa.

Figure 15:
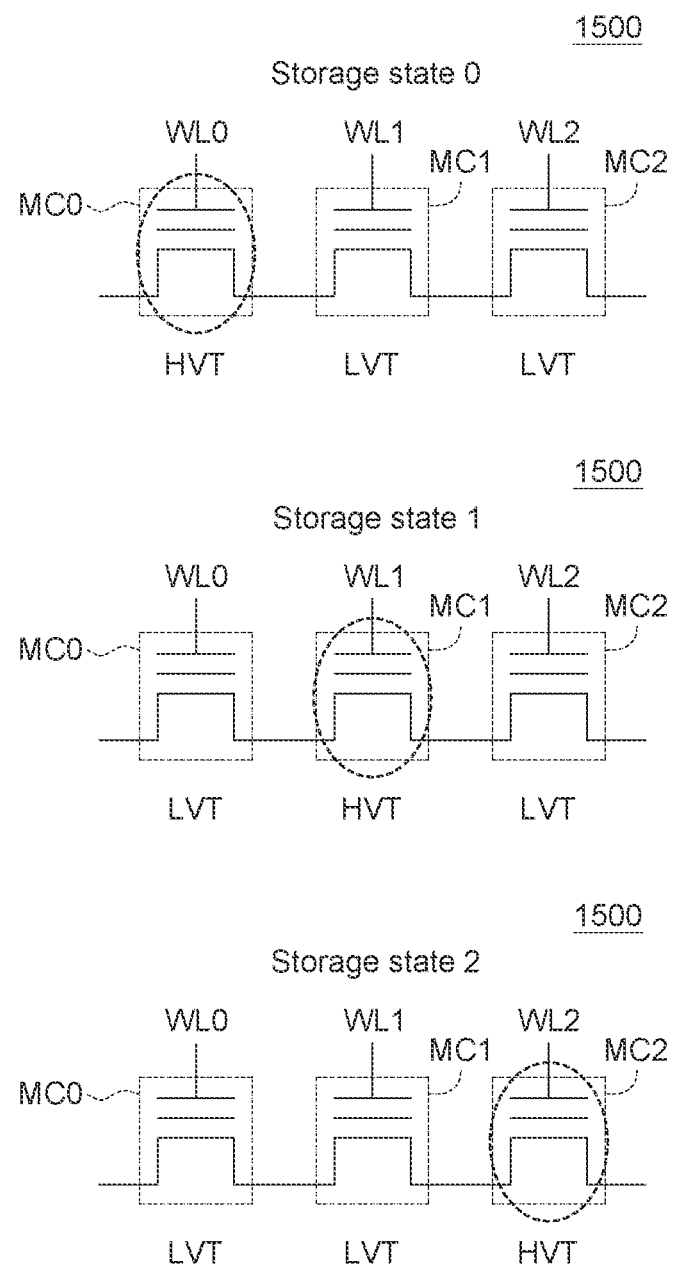
FIG. 15 shows storage states 0~2 of the memory cell group according to one embodiment of the application.

FIG. 15 shows storage states 0~2 of the memory cell group according to one embodiment of the application. The memory cell group 1500 includes three adjacent or non-adjacent memory cells coupled to the same bit line.

One memory cell of the memory cell group 1500 is programed into high threshold voltage (HVT) and the other two memory cells are programed into low threshold voltage (LVT). For example but not limited by, when the memory cell MC0 is programed into high threshold voltage (HVT) and the other two memory cells MC1-MC2 are programed into low threshold voltage (LVT), the memory cell group 1500 has storage state 0. When the memory cell MC1 is programed into high threshold voltage (HVT) and the other two memory cells MC0, MC2 are programed into low threshold voltage (LVT), the memory cell group 1500 has storage state 1. When the memory cell MC2 is programed into high threshold voltage (HVT) and the other two memory cells MC0-MC1 are programed into low threshold voltage (LVT), the memory cell group 1500 has storage state 2. Thus, the memory cell group 1500 has at most $C_1^3=3$ storage states.

In searching the memory cell group 1500, the voltage setting is similar to that in FIG. 13. For example but not limited by, in one embodiment of the application, the search data is encoded into a search voltage group (including three search voltages). The search data 0 is encoded into the first search voltage having the high voltage VH, the second and the third search voltages having the low voltage VR; the search data 1 is encoded into the second search voltage having the high voltage VH, the first and the third search voltages having the low voltage VR; and the search data 2 is encoded into the third search voltage having the high voltage VH, the first and the second search voltages having the low voltage VR. The first to the third search voltages are applied to the gates of the three memory cells of the memory cell group 1500 via different word lines.

Similarly, in data search, when the search data is matched with the storage data, the memory cell group 1500 generates the current; and vice versa.

Figure 16:
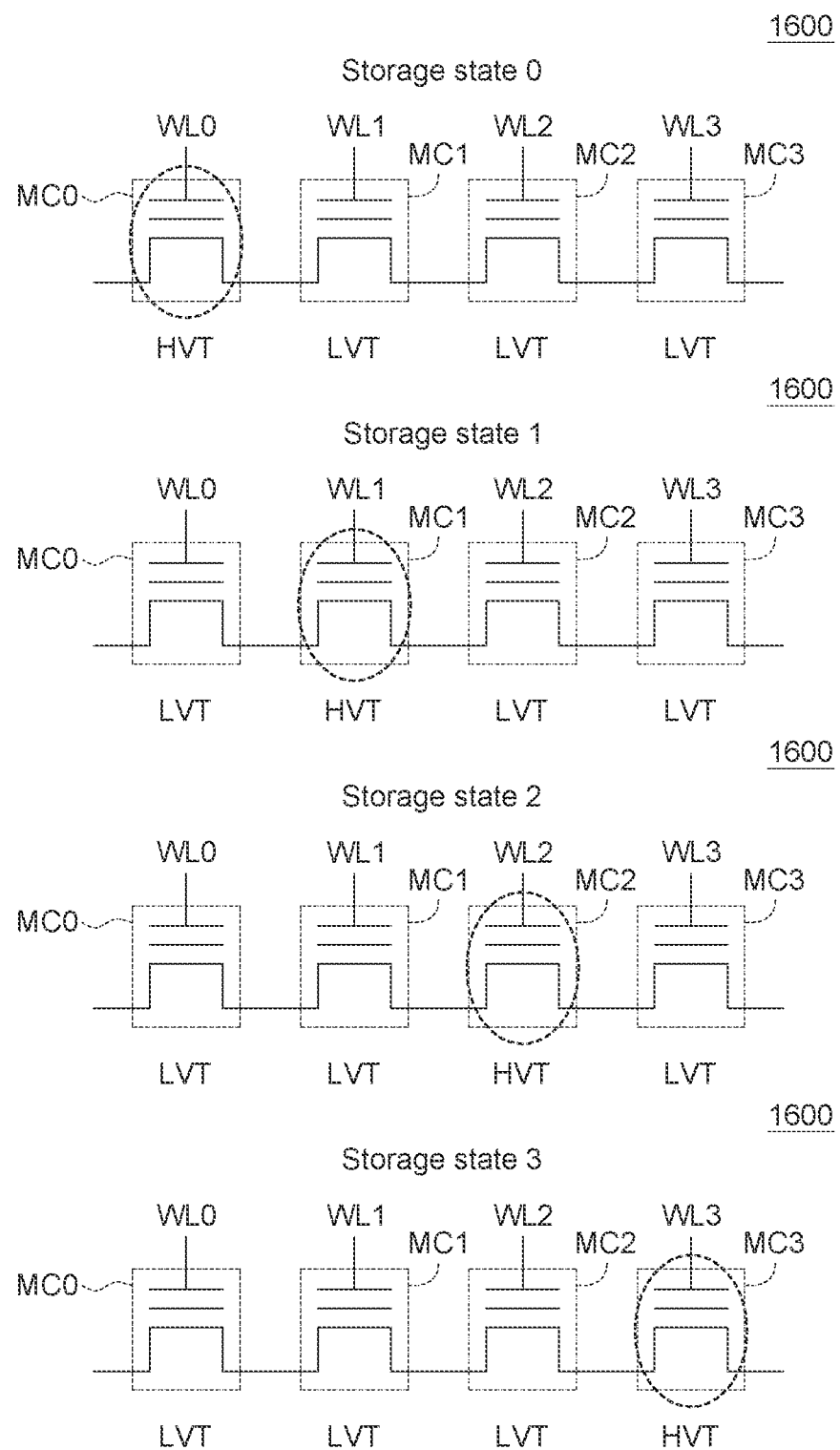
FIG. 16 shows storage states 0~3 of the memory cell group according to one embodiment of the application.

FIG. 16 shows storage states 0~3 of the memory cell group according to one embodiment of the application. The memory cell group 1600 includes four adjacent or non-adjacent memory cells coupled to the same bit line. One memory cell of the memory cell group 1600 is programed into high threshold voltage (HVT) and the other three memory cells are programed into low threshold voltage (LVT). The details of the storage states of the memory cell group 1600 are similar, and thus are omitted here. Thus, the memory cell group 1600 has at most $C_1^4=4$ storage states.

In searching the memory cell group 1600, the voltage setting is similar to that in FIG. 13. For example but not limited by, in one embodiment of the application, the search data is encoded into a search voltage group (including four search voltages), wherein one of the search voltages having the high voltage VH while the other three search voltages having the low voltage VR. The details are similar and thus are omitted here.

Similarly, in data search, when the search data is matched with the storage data, the memory cell group 1600 generates the current; and vice versa.

Figure 17:
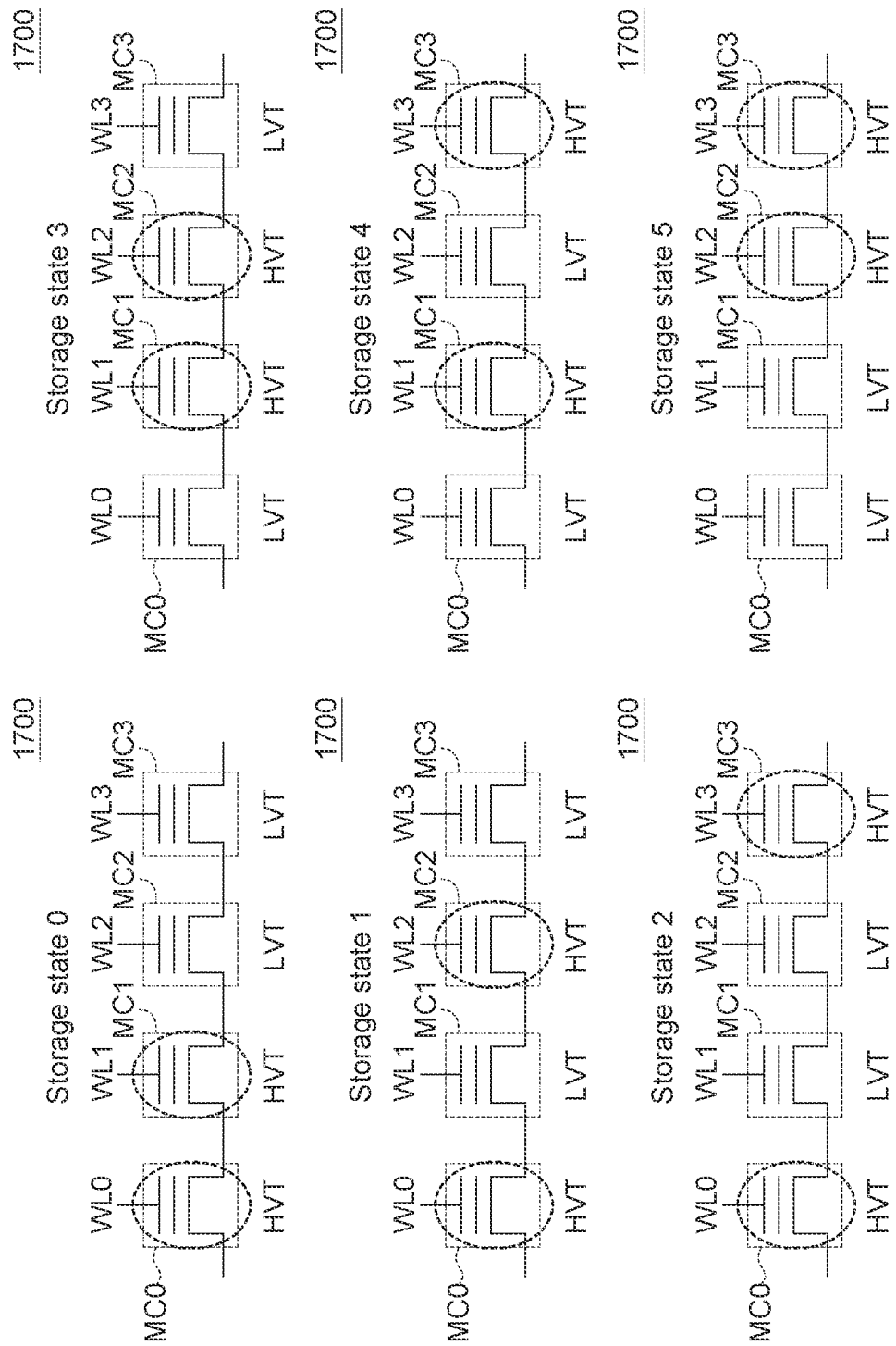
FIG. 17 shows storage states 0~5 of the memory cell group according to one embodiment of the application.

FIG. 17 shows storage states 0~5 of the memory cell group according to one embodiment of the application. The memory cell group 1700 includes four adjacent or non-adjacent memory cells coupled to the same bit line. Two memory cells of the memory cell group 1700 are programed into high threshold voltage (HVT) and the other two memory cells are programed into low threshold voltage (LVT). The details of the storage states of the memory cell group 1700 are similar, and thus are omitted here. Thus, the memory cell group 1700 has at most $C_2^4=6$ storage states.

In searching the memory cell group 1700, the voltage setting is similar to that in FIG. 13. For example but not limited by, in one embodiment of the application, the search data is encoded into a search voltage group (including four search voltages), wherein two of the search voltages having the high voltage VH while the other two search voltages having the low voltage VR. The details are similar and thus are omitted here.

Similarly, in data search, when the search data is matched with the storage data, the memory cell group 1700 generates the current; and vice versa.

In other possible embodiment of the application, the memory cell group of FIG. 17 may have storage states 0~4 which is still within the spirit and the scope of the application.

As described above, in the embodiments of the application, when data is written into the memory cell group, m (m being a positive integer, m word lines are as a group (i.e. m memory cells are as a memory cell group and the m memory cells are coupled to the same bit line). Among the m memory cells, there are n (n being a positive integer, n≥1) memory cells programmed as high threshold voltage and (m-n) memory cells programmed as low threshold voltage. The m memory cells have at most $C_n^m$ storage states. The number of the storage states of the memory cell group is corresponding to the state number of the dimension vector of the feature vector of the database object. For example, when the state number of each dimension vector of the feature vector of the database object a is 6, then he number of the storage states of the memory cell group is equal to or larger than 6.

In data search, the search data is encoded into m search voltages which are input into the memory cell group via m word lines, wherein there are n search voltages having the high voltage VH and (m-n) search voltages having the low voltage VR. Thus, the search voltages encoded from the search data have $C_n^m$ combinations. When the search data is matched with the storage data, the search result is matched and the memory cell group generates the current, and vice versa. The combination number of the search voltages is corresponding to the number of the vector states of the feature vector of the database object. For example, when each dimension vector of the feature vector of the object a is 6, the combination number of the search voltages is also 6.

In data searching, p (p being a positive integer equal to or larger than 2) memory blocks coupled to the same bit line are concurrently selected and the sensing currents from the p memory blocks coupled to the same bit line are flown into the sensing amplifier of the page buffer to generate the search result. When the sensing current is higher, the similarity between the search data and the storage data is higher. Thus, the similarity is determined by using the sensing current. For example but not limited by, when the feature vector of the database object has 512 dimensions, in searching the database object, p is at least equal to or larger than 512. That is, the value of p is corresponding to the dimension number of the feature vector of the database object.

Further, a memory plane includes q memory blocks, wherein p<(q/2). That is, the memory plane may store at least two feature vectors of the database object.

Figure 18:
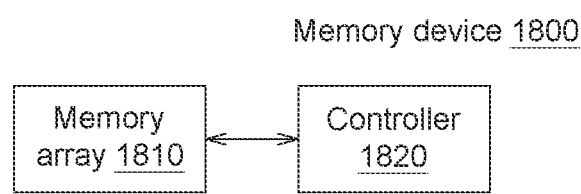
FIG. 18 shows a functional block diagram of a memory device according to one embodiment of the application.

FIG. 18 shows a functional block diagram of a memory device according to one embodiment of the application. The memory device 1800 includes: a memory array 1810; and a controller 1820, coupled to the memory array 1810. The controller 1820 is configured for: based on a recorded compression mode, vectoring a search data to generate a search data vector, and based on the recorded compression mode, compressing the search data and a plurality of objects in a database, the plurality of objects of the database are stored in the memory array 1810; setting a search condition; searching the objects of the database by the search data vector to determine whether the search data is matched with the objects of the database of the memory array 1810; and recording and outputting at least one matched object of the database, the at least one matched object matched with the search data.

In the above embodiments of the application, a plurality of object data in the database are vectored by the model into object vectors (or feature vectors), which are high dimension low resolution. By so, simple calculation and low storage capacity requirements are achieved. Further, the object vectors are partitioned (i.e. compressed or digitalized), for example but not limited by, dimension equal-quantity partition.

In the above embodiments of the application, via introducing the mask vectors, the vectors which are low confidence are masked to improve match confidence.

In the above embodiments of the application, the memory device may be non-volatile memory, or volatile NAND flash memory.

The memory device and the data search method in the above embodiments of the application may be applied in automotive devices, mobile devices, edge devices and so on.

Thus, the memory device and the data search method in the above embodiments of the application may achieve simple calculation but high analysis confidence.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A data search method for a memory device, the data search method comprising:
    based on a recorded compression mode, vectoring a search data to generate a search data vector by a controller, and based on the recorded compression mode, compressing the search data and a plurality of objects in a database which is stored in a plurality of memory cells of a plurality of memory blocks of the memory device;
    setting a search condition based on the search data vector by the controller and the search data being encoded into a plurality of search voltages;
    applying the search voltages to the memory cells of the memory blocks to search the objects of the database by the search data vector to determine whether the search data based on the search condition is matched with the objects of the database stored in the memory cells by the controller; and
    recording and outputting at least one matched object of the database, the at least one matched object matched with the search data by the controller.

2. The data search method according to claim 1, wherein the step of recording the at least one matched object of the database includes recording an object number, an object name and a matched value of the at least one matched object.

3. The data search method according to claim 1, wherein the step of outputting the at least one matched object of the database includes outputting original data of the at least one matched object, a sorted data of the at least one matched object, several object data having predetermined matched degree and an object data having highest matched degree.

4. The data search method according to claim 1, wherein
    the recorded compression mode includes a data-equal-quantity compression mode or a dimension-equal-quantity compression mode; and
    the search condition includes a matched dimension quantity or a matched dimension ratio.

5. The data search method according to claim 1, further including:
    generating and storing respective feature vectors of the objects of the database; and
    generating a feature vector of the search data;
    wherein the feature vector of the search data is compared with the respective feature vectors of the objects of the database to determine whether the search data is matched with the objects of the database.

6. The data search method according to claim 5, further including:
    generating and storing respective mask vectors of the objects of the database based on a mask ratio;
    based on the mask vectors of the objects of the database, the feature vector of the search data is compared with the respective feature vectors of the objects of the database to determine whether the search data is matched with the objects of the database.

7. The data search method according to claim 5, wherein
    as for multi-dimension vectors of the object, most common values of the respective multi-dimension vectors of the object are as the feature vector of the object; and
    as for multi-dimension vectors of the search data, most common values of respective multi-dimension vectors of the search data are as the feature vector of the search data.

8. The data search method according to claim 1, wherein based on the recorded compression mode, each dimension vector of the object of the database is compressed as or below 3 bits, and each dimension vector of the search data is compressed as or below 3 bits.

9. A memory device comprising:
    a plurality of memory planes, each of the memory planes including a memory array, the memory array including a plurality of memory blocks, a plurality of word lines and a plurality of bit lines, each of the memory blocks including a plurality of memory cells on a plurality of intersections between the word lines and the bit lines;
    wherein
    in each of the memory blocks, a memory cell group includes the m memory cells, n memory cells among the m memory cells are programmed to have a first threshold voltage and (m-n) memory cells among the m memory cells are programmed to have a second threshold voltage, m being a positive integer equal to or larger than 2, n being a positive integer equal to or larger than 1, the memory cell group stores a first feature vector of a first object;
    in data search, a search data is encoded into m search voltages, n search voltages among the m search voltages have a first search voltage and (m-n) search voltages among the m search voltages have a second search voltage;
    in data search, p memory blocks coupled to a first bit line are concurrently selected, p being a positive integer equal to or larger than 2; and based on a current sensing result on the first bit line, determining whether the search data is matched with the first feature vector of the first object stored in the memory cell group.

10. The memory device according to claim 9, wherein
the first threshold voltage is higher than the second threshold voltage; and
the first search voltage is higher than the second search voltage.

11. The memory device according to claim 9, wherein each of the memory plane includes an analog-to-digital converter converting the current sensing result into a digital signal for determining whether the search data is matched with the first feature vector of the first object stored in the memory cell group.

12. The memory device according to claim 9, wherein in the memory cell group, the m memory cells are adjacent or non-adjacent.

13. The memory device according to claim 9, wherein
each of the memory blocks includes a bit line transistor and a ground select transistor; and
before data search, the p bit line transistors and the p ground select transistors of the p memory blocks coupled to the first bit line are concurrently turned on to select the p memory blocks.

14. The memory device according to claim 9, wherein the m memory cells of the memory cell group has at most $C_n^m$ storage states, and a number of the storage states of the memory cell group is corresponding to a state number of a dimension vector of the feature vector of the first object,
wherein, in the function $C_n^m$, m and n are based on numbers of m and n memory cells respectively, and m and n are integers,
wherein m is greater or equal to 2 and n is greater or equal to 1.

15. The memory device according to claim 14, wherein the m search voltages encoded from the search data have $C_n^m$ combinations; and a combination number of the m search voltages is corresponding to the state number of the dimension vector of the feature vector of the first object.

16. The memory device according to claim 9, wherein each of the memory plane stores at least two feature vectors of at least one database object.

17. The memory device according to claim 9, wherein each dimension of the feature vector of the search data has several vector states and the number of the vector states is equal to or lower than 3 bits or 8 bits; and each dimension of the feature vector of the first object has several vector states and the number of the vector states is equal to or lower than 3 bits or 8 bits.

18. A memory device comprising:
a memory array; and
a controller, coupled to the memory array,
wherein the controller is configured for:
based on a recorded compression mode, vectoring a search data to generate a search data vector, and based on the recorded compression mode, compressing the search data and a plurality of objects in a database, the plurality of objects of the database are stored in a plurality of memory cells of a plurality of memory blocks of the memory array;
setting a search condition based on the search data vector by the controller and the search data being encoded into a plurality of search voltages;
applying the search voltages to the memory cells of the memory blocks to search the objects of the database by the search data vector to determine whether the search data based on the search condition is matched with the objects of the database stored in the memory cells of the memory array by the controller; and
recording and outputting at least one matched object of the database, the at least one matched object matched with the search data by the controller.

* * * * *